(12) United States Patent
Takehiro et al.

(10) Patent No.: US 7,072,952 B2
(45) Date of Patent: Jul. 4, 2006

(54) SPANNING TREE BYPASSING METHOD AND APPARATUS

(75) Inventors: Tsuyoshi Takehiro, Kawasaki (JP); Hiroshi Kinoshita, Fukuoka (JP); Atsuko Higashitaniguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 10/198,708

(22) Filed: Jul. 18, 2002

(65) Prior Publication Data

US 2004/0255050 A1      Dec. 16, 2004

(30) Foreign Application Priority Data

Jan. 22, 2002   (JP)   .............................. 2002-013423

(51) Int. Cl.
*G06F 15/177*   (2006.01)

(52) U.S. Cl. ...................... 709/221; 709/252; 370/254; 370/256

(58) Field of Classification Search ........ 709/238–239; 370/254–256
See application file for complete search history.

(56) References Cited

U.S. PATENT DOCUMENTS 6,771,610 B1 *   8/2004   Seaman ...................... 370/256
2001/0021177 A1 *   9/2001   Ishii ........................... 370/256

FOREIGN PATENT DOCUMENTS

JP   11-355337   12/1999

* cited by examiner

*Primary Examiner*—Wen-Tai Lin
(74) *Attorney, Agent, or Firm*—Katten Muchin Rosenman LLP

(57) ABSTRACT

A route bypassing a root node is constructed in a network in which a spanning tree is formed. A received frame is sent out on a designated port as well as on a root port by using a designated-port data send-out function, provided that a transmitting port for the received frame is learned on the root port. When a frame is received on a blocking port, a transmitting port for a frame whose destination matches the source address of the received frame is temporarily learned on the blocking port by using a blocking-port learning function, on the condition that the destination of the received frame is already learned on some other port. When a frame whose destination matches the temporarily learned address is received, the temporary learning is changed to normal learning by using a temporarily learned address-based data transfer function.

6 Claims, 18 Drawing Sheets

● ROOT PORT
■ DESIGNATED PORT
× BLOCKING PORT

SPANNING TREE BYPASSING METHOD AND APPARATUS

BACKGROUND OF THE INVENTION

1. Field of the Invention

The present invention relates to a method and apparatus for bypassing a spanning tree constructed in a network.

The explosive growth of the Internet in recent years has brought about a need for a wide-area LAN with which a network can be constructed, in an inexpensive way, as a network within a corporation or a provider providing Internet services to home users.

To achieve this, a spanning tree more efficient than a traditional spanning tree must be constructed in a wide-area LAN in order to make efficient use of network resources.

2. Description of the Related Art

In a LAN constructed with a plurality of nodes, a network of a tree structure containing no loops can be constructed using Spanning Tree Protocol (hereinafter abbreviated STP). STP is an important protocol defined in IEEE 802.ID-1998 as a required function.

A network constructed based on STP has a loop-free tree structure with a root node at its apex by setting blocking ports that cannot perform data transfer.

For example, in FIG. 1, by exchanging BPDU (Bridge Protocol Data Unit) messages between bridges, bridge 1 is determined as the root node in accordance with a prescribed rule. At this time, of the ports on each of the segments defined by line segments in the figure connecting between the bridges 1 to 6, the port closest to the root node is determined as a designated port which is indicated by a solid black square in the figure. Further, of the ports on each bridge, the port closest to the root node is determined as a root port which is indicated by a solid black circle in the figure. Any other port that is neither a designated port nor a root port is a blocking port which is indicated by a mark in the figure. In this way, a spanning tree, shown by thick lines in the figure, is formed.

While setting such blocking ports has the advantage of preventing the occurrence of loops, the following problems arise because of the existence of unused routes: (i) since traffic is concentrated at the root node, congestion occurs near the root node, (ii) if there is a better route than the route passing through the root node, such a route is not used, resulting in inefficient use of network resources, and (iii) delays occur as a result of (i) and (ii).

To solve these problems, Japanese Unexamined Patent Publication No. 11-355337 proposes that a route not used in a tree structure be made usable so that data can be transferred by bypassing the root node.

As shown in FIG. 2, according to the technique proposed in the above publication, a node (for example, bridge 4) that has a blocking port transmits a bypass route setup request (bypass request) 10 to a destination node (bridge 3) in a network constructed using a spanning tree. The node that received the bypass request rewrites the routing table in accordance with the routing information contained in the bypass request. Then, a bypass response 12 is returned to the requesting node by including therein routing information concerning a designated port. The node that received the bypass response rewrites the routing table in accordance with the routing information contained in the response, and transmits data to the destination node by using the thus constructed bypass route.

The above bypass route construction method is not realistic for the following reason.

In a network constructed using a spanning tree, address learning is an indispensable and important function, and a forwarding table for identifying the destination is constructed using this function. In the above method, however, no mention whatsoever is made of address learning, but it is only stated that a bypass route is constructed based on STP information; if a bypass route is constructed by the above method, when it comes to actually transmitting data, it is not known on which bypass route the data should be transmitted because address learning is not considered and, in reality, it is not possible to use the bypass route. It is also not known at which timing the bypass request is to be sent out. If it is assumed that the bypass request is sent out at the time that the blocking port is recognized, the information to be exchanged between the bridges has not yet been created at that time; on the other hand, if it is assumed that the request is sent out at the time that address learning is done, this would means sending out a bypass request each time each node in the network performs address learning, and sending out bypass requests so frequently is not realistic when the network load and the processing capability of each node are considered.

Accordingly, with the above prior art, it is not realistically possible to use a bypass route.

Furthermore, the above-described method assumes that a routing table holds destination network (LAN), metrics, and next node information is managed at that node; however, while holding such information is possible at Layer 3, at Layer 2 it is not possible to know to which network (LAN) the destination address belongs, and besides, exchange of routing information between nodes is not performed (not defined in the IEEE 802.ID), so that in reality such a routing table cannot be used at Layer 2.

SUMMARY OF THE INVENTION

Accordingly, it is an object of the present invention to solve the above-described three problems by forming a bypass route based on address learning and transmitting data over the bypass route.

The present invention provides a spanning tree bypassing method comprising the steps of: in a first node, sending a first frame, whose destination address is a first address and whose source address is a second address, out on a designated port as well as on a root port when the first frame is received, provided that learning is done so as to send any frame destined for the first address out on the root port; and in a second node having received the first frame on a blocking port, sending a second frame, whose destination address is the second address, out on the blocking port when the second frame is received.

Preferably, the blocking-port send-out step includes the substeps of: performing temporary learning so as to send any frame destined for the second address out on the blocking port, when the first frame is received on the blocking port; and sending the second frame, whose destination address is the second address, out on the blocking port by switching the temporary learning to normal learning when the second frame is received.

Preferably, in the temporary learning step, the temporary learning is performed on the condition that learning is already done as to on which port a frame, destined for the first address, is to be sent out.

The present invention also provides a spanning tree bypassing apparatus comprising: means for sending a first frame, whose destination address is a first address, out on a designated port as well as on a root port when the first frame is received, provided that learning is done so as to send any frame destined for the first address out on the root port; and means for sending a second frame, whose destination address is a second address, out on a blocking port when the second frame is received after a third frame, whose source address is the second address, was received on the blocking port.

DESCRIPTION OF THE PREFERRED EMBODIMENTS

Figure 1:
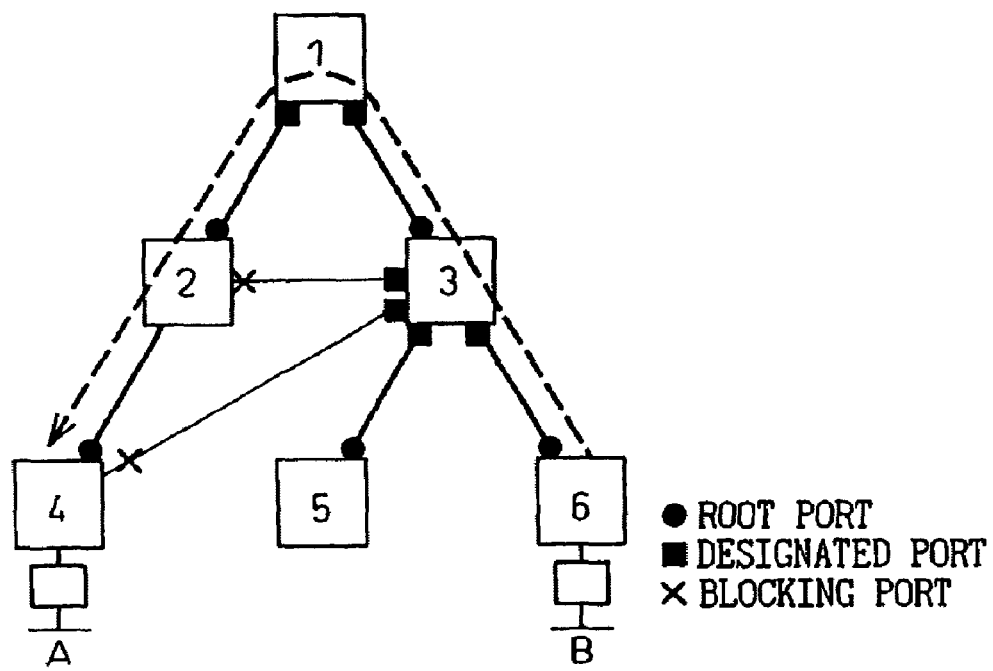
FIG. 1 is a diagram showing a spanning tree constructed in a network.
Figure 2:
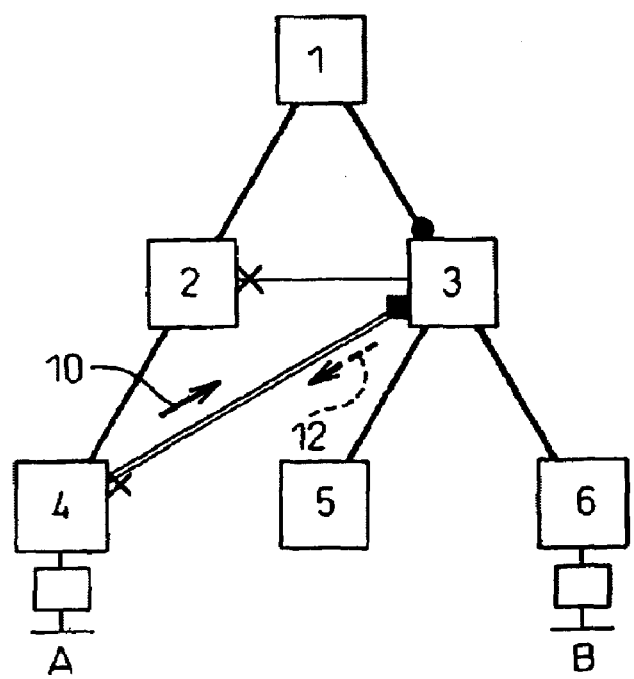
FIG. 2 is a spanning tree bypassing method according to the prior art.
Figure 3:
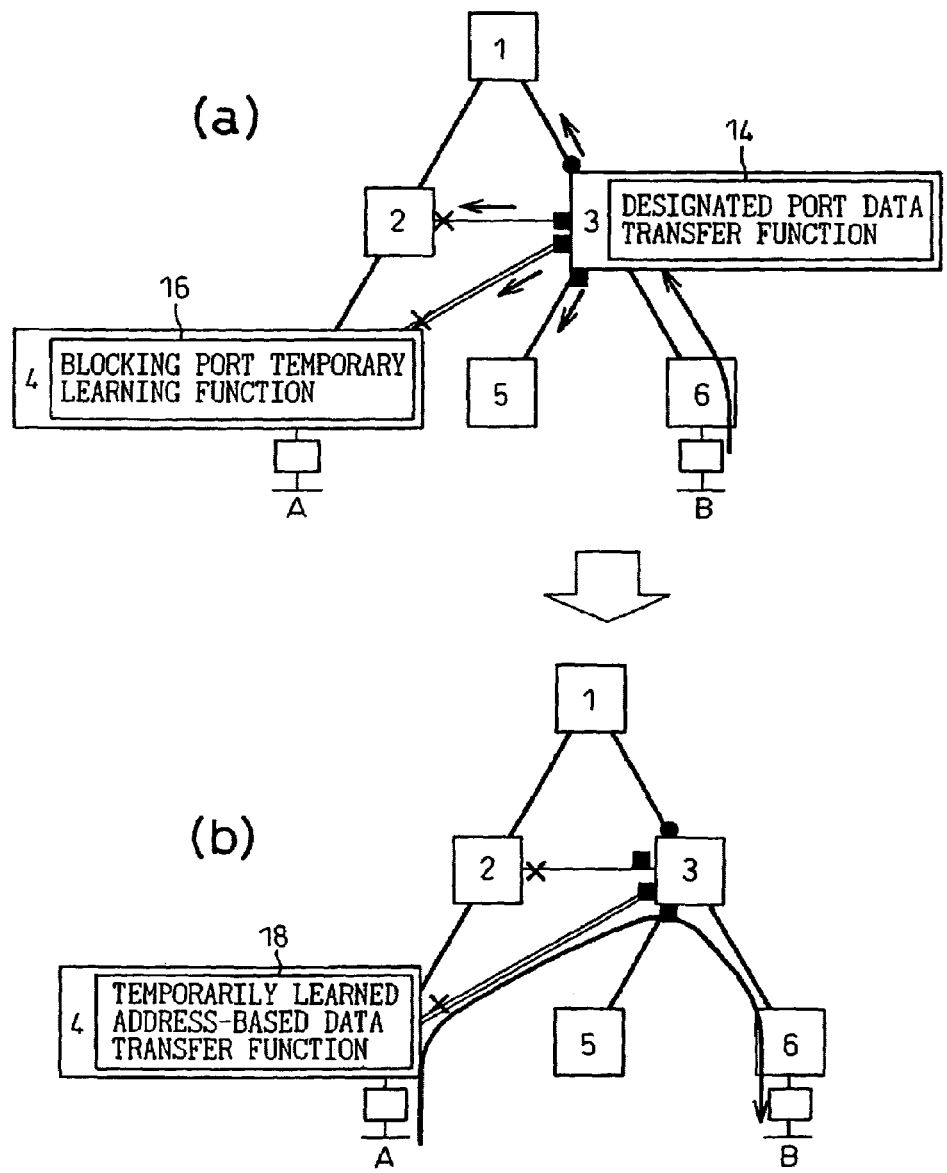
FIG. 3 is a diagram for explaining a spanning tree bypassing method and apparatus according to the present invention.

FIG. 3 is a diagram for explaining one embodiment of a spanning tree bypassing method according to the present invention. As shown in FIG. 3(*a*), a spanning tree with bridge 1 as the root node is constructed with bridges 1 to 6 and segments connecting between them. It is assumed here that address learning is already done at each bridge.

When a frame addressed to a terminal A is sent out from a terminal B, the frame is transferred through the bridge 6 and reaches the bridge 3. According to the method of the present invention, when learning is done at the bridge 3 so that any frame addressed to the terminal A is sent out on its root port (indicated by solid black circle ●), the frame is sent out on the root port and, at the same time, the frame is also sent out on a designated port, preferably on all the designated ports (indicated by solid black square) (designated-port data transfer function 14). In other cases, that is, when the learned port for data transfer is a designated port, the frame is sent out only on that learned port.

At the bridges 2 and 4, the frames sent out from the designated ports on the bridge 3 are received on the respective blocking ports (X). At this time, according to the present invention, on the condition that learning is already done as to on which port a frame, whose destination address matches the address of the terminal A, the destination of the received frame, is to be sent out, the blocking port is temporarily learned as the port on which a frame whose destination address matches the address of the terminal B, the source of the received frame, is to be sent out (blocking-port temporary learning function 16).

After that, when a frame addressed to the terminal B is sent out from the terminal A, as shown in FIG. 3(*b*), the bridge 4 switches the learning state of the blocking port from temporary learning to normal learning, that is, the blocking port is learned as the port on which any frame addressed to the terminal B is to be sent out, and the received frame is sent out on the blocking port (temporarily learned address-based data transfer function 18).

As a result, the frame is transmitted over the bypass route from the bridge 4 to the bridge 6 via the bridge 3, and reaches the terminal B. This bypass route is also learned for frames to be transmitted in the reverse direction from the terminal B to the terminal A.

The temporary learning is performed on the condition that learning is already done as to on which port a frame whose destination address matches the address of the terminal A is to be sent out, as described above; the reason for this is to set up a bypass route for the original route in a reliable manner by confirming that the node is a node on the original route passing through the root node. Further, the reason that the learning state is held in the "temporary learning" state until the frame in the reverse direction addressed to the terminal B arrives is that, by distinguishing it from the normal learning state, the learning of the bypass route can be prevented from being overwritten with normal learning for a frame arriving with a delay via the root node.

The above function need not be provided in all the nodes forming the spanning tree; in the example of FIG. 3, if the above function is provided in at least the node 3 and the node 4, frame transmission bypassing the root node can be accomplished.

Figure 4:
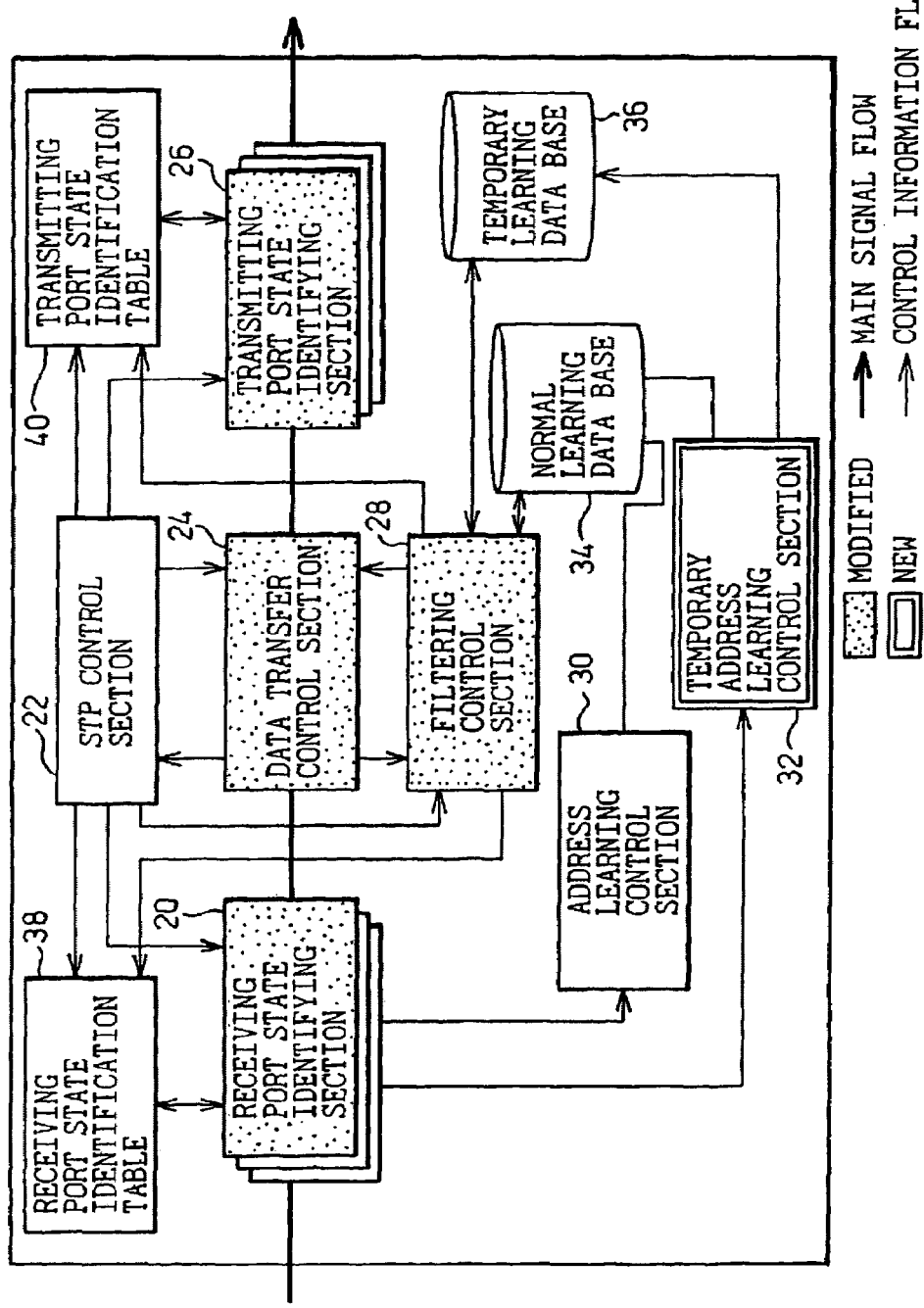
FIG. 4 is a block diagram showing the configuration of a bridge device as one embodiment of a device implementing the spanning tree bypassing method of the present invention.

FIG. 4 shows the configuration of a bridge device as one embodiment of a device having a spanning tree bypassing function for implementing the above-described bypassing method.

A receiving port state identifying section 20 identifies the state of the port on which data is received, and performs data transfer in accordance with the identified state. If the state is a blocking state, address information is also sent to a temporary address learning control section 32.

An STP control section 22 performs spanning tree protocol control operations such as the creation/reception of a BPDU message, the computation of a spanning tree, and port state transition management.

A data transfer control section 24 performs data transfer control operations in accordance with path information supplied from a filtering control section 28 (described later).

A transmitting port state identifying section 26 forcefully performs data transmission using a blocking port, provided that there is a normal learning entry for the blocking port.

The filtering control section 28, based on a data base 34 created by an address learning control section 30 (described later), supplies the data transfer control section 24 with outgoing path (outgoing port) information for data transmission. At this time, it is determined whether the port on which the destination address is learned is the root port or not, and if it is the root port, the data transfer control section 24 is notified to transfer the data also to a designated port.

Further, it is determined whether the destination address is temporarily learned on the blocking port, and if it is temporarily learned, the learning state is switched to the normal learning state and entered into the normal learning data base.

The address learning control section 30 associates the source address of the data received on a learning port or a forwarding port with its receiving port, and creates a data base used for filtering control.

A temporary address learning control section 32 is a functional block newly provided in accordance with the present invention; when it is determined that the destination address of the frame received on the blocking port is already learned on some other port, the temporary address learning control section 32 associates its source address with the receiving blocking port, and creates a temporary learning data base 36 based on which a bypass route is to be created.

According to the present invention, in a network having a spanning tree constructed by the spanning tree protocol operation of the STP control section 22 at each node by exchanging BPDU messages, address learning on the root port and the designated port can be accomplished using the function of the address learning control section 30 in the usual manner. With this address learning done, data can also be transferred to the designated port by using the function provided in the filtering control section 28 by which, when the learned port is the root port, the data transfer control section 24 is notified to transfer the data also to the designated port, that is, the designated port data transfer function 14 of the node 3 (FIG. 3). If the port of the node 4 connected at the opposite end of the designated route on the node 3 is in a blocking state, in the node 4 the receiving port state identifying section 20 transfers the address information to the temporary address learning control section 32. The temporary address learning control section 32 determines whether or not the destination address of the received data (the address of the terminal A) is already learned on some other port of the node 4, and if it is already learned on some other port, its source address (the address of the terminal B) is temporarily learned using the blocking port temporary learning function 16. In this condition (with the address of the terminal B temporarily learned on the blocking port of the node 4), when the node 4 receives data addressed to B from A, the data can be transmitted via the blocking port by using the function provided in the filtering control section 28 by which, when the address is temporarily learned on the blocking port, the temporary learning state is switched to the normal learning state and the data transfer control section 24 is notified to transfer the data to the blocking port, and the function provided in the transmitting port state identifying section 26 by which the data is forcefully transferred to the blocking port if there is a normal learning entry for it, that is, the temporarily learned address-based data transfer function 18. In this way, using the conventional bridge function, the node 3 can recognize that the terminal A is located at the opposite end of the designated route of the node 4, and the data can thus be transmitted using that port, i.e., the bypass route.

Figure 5:
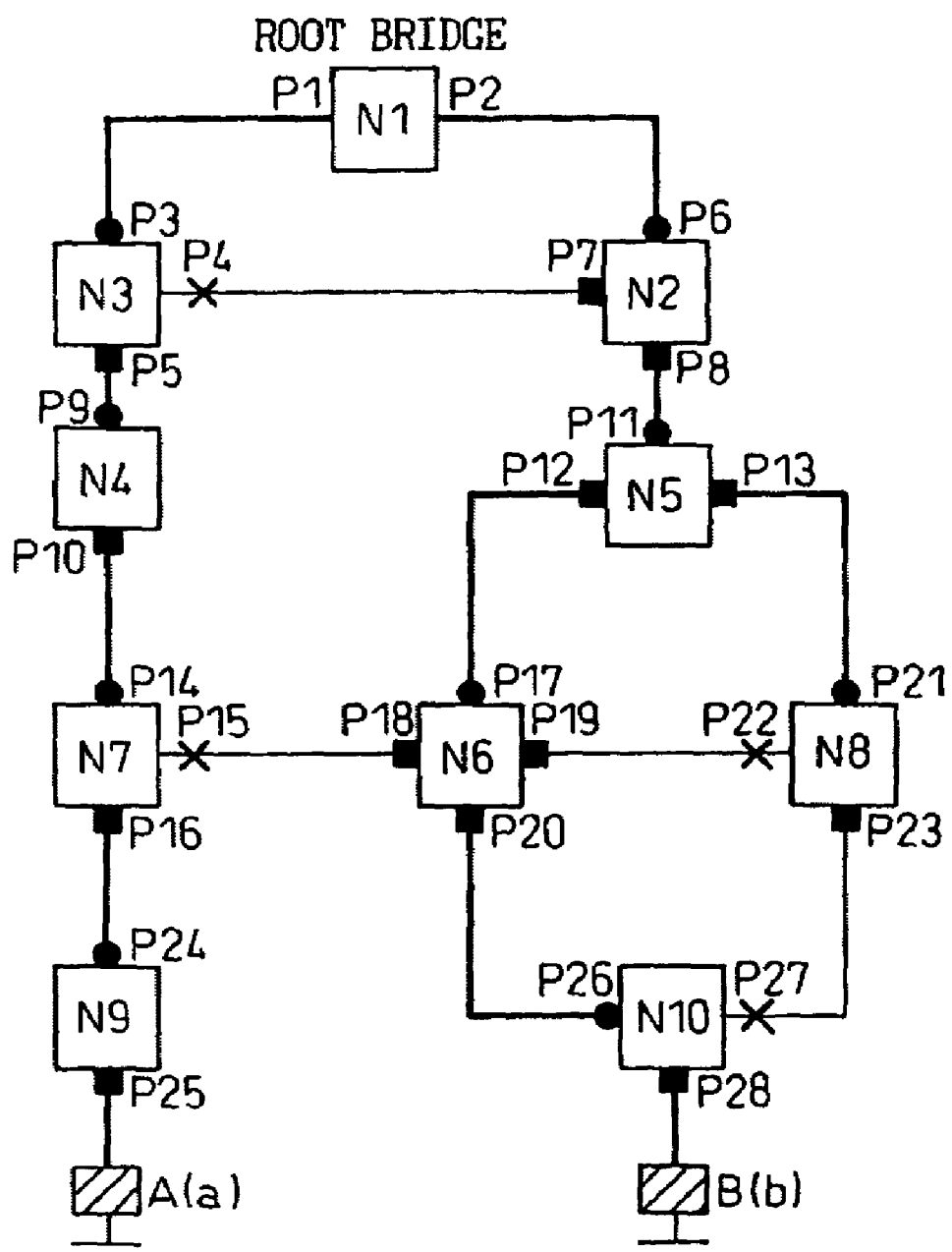
FIG. 5 is a diagram showing the details of one example of a network in which a spanning tree is formed.

FIG. 5 shows the detailed structure of a network constructed with bridges where the path is determined in accordance with a spanning tree. In FIG. 5, the spanning tree with bridge N1 as the root bridge is constructed as shown by thick lines by using the conventional spanning tree protocol (STP) processing function, that is, by exchanging BPDU messages. Thin lines each indicate a segment having a blocking port. N1 to N10 designate the bridges forming the network. P1 to P28 denote ports on the respective ports. A and B represent frame transmitting terminals, and a and b indicate their MAC addresses. Solid black circle indicates a root port on each bridge, showing that the port is in the forwarding state. Solid black square indicates a designated port on each segment, showing that the port is in the forwarding state. Ports marked with X are ports in the blocking state.

As the present invention constructs the bypass route using a main signal, transmission/reception of a BPDU message as an STP control signal is not affected at all, and even with bridges to which the present invention is applied, the spanning tree can be constructed in the usual manner.

For the present invention to function, it is required that address learning be done at the bridges at both ends of the bypass route to be constructed. First, a description will be given in the time sequence of frame transfer to explain how the address learning is performed in the usual manner by transferring frames α and β, and how the functions added in the present invention are implemented without affecting the traditional functions. It will also be explained why, at this time, the designated port data transfer function 14, the blocking port temporary learning function 16, and the temporarily learned address-based data transfer function 18 in FIG. 3 do not operate.

Figure 6:
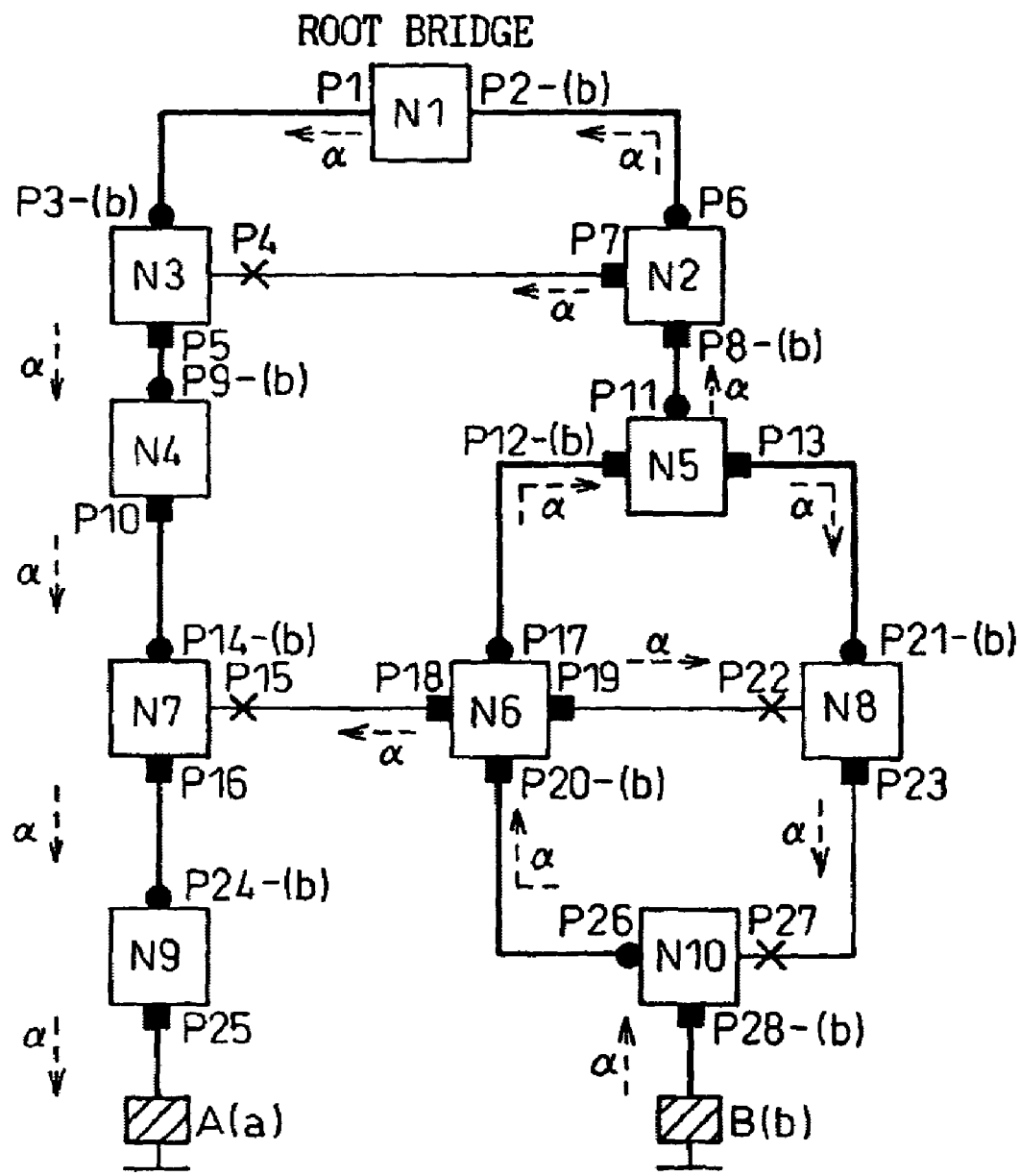
FIG. 6 is a diagram showing a first process of address learning in the network of FIG. 5.

FIG. 6 shows the transfer result of the frame α at each bridge when the frame α is first transmitted from the terminal B toward the terminal A. Bridge N10 receives the frame α on its port P28, and transfers the frame α with source address b and destination address a to the bridge N6 via the port P26. The transfer operation will not be described here, but will be described in detail with reference to the next bridge N6.

The following explains how the transfer of the frame a and the learning of the address b can be performed at the bridge N6 in the usual manner, and why the designated port data transfer function 14 does not operate unless the address learning is done. When the bridge N6 receives the frame α at its port P20, the receiving port state identifying section 20 refers to a receiving port state identification table 38 whose contents are shown in Table 1 by using the receiving port number as the search key, and identifies the state of the receiving port in accordance with the flow shown in FIG. 7.

TABLE 1

Receiving Port State Identification Table 38 (N6)

| | Receiving port number | Disable *1 | Port state *2 | Bypass route *3 | |
|---|---|---|---|---|---|
| Indexed by receiving port number | P17 | 0 | 3 | 0 | |
| | P18 | 0 | 3 | 0 | |
| | P19 | 0 | 3 | 0 | |
| | P20 | 0 | 3 | 0 | |
| | 0 | 1 | 0 | 0 | (Initial value) |
| | • | • | • | • | |
| | • | • | • | • | |

Notes
*1: Disabled state 1, otherwise 0.
*2: Valid only when not in disabled state. Blocking state 0, Listening state 1, Learning state 2, Forwarding state 3.
*3: Valid only when in blocking state. 1 if there is a 5 bypass route, 0 if there is no bypass route.

Figure 7:
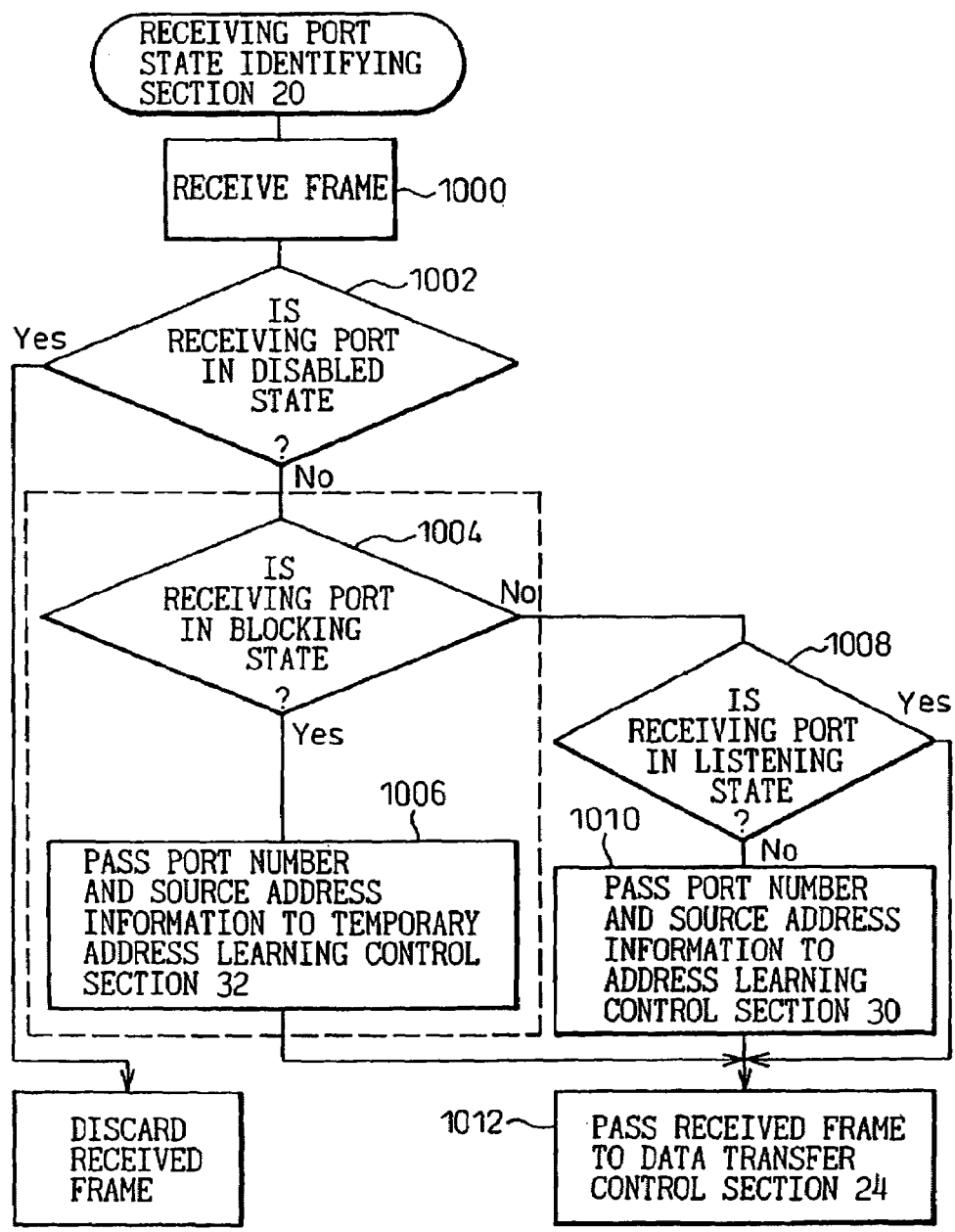
FIG. 7 is a flowchart showing the processing performed in a receiving port state identifying section 20.

In FIG. 7, the steps enclosed by dashed lines are the processing steps added in the present invention; according to Table 1, as the port P20 is in the forwarding state, the frame α is processed in steps 1000, 1002, 1004, 1008, 1010, and 1012 in this order, and transferred to the data transfer control section 24. At the same time, source MAC address and port information is sent from the receiving port state identifying section 20 to the address learning control section 30 (step 1010). It is thus learned that a device having the MAC address b exists under the port P20, and the learned results are entered in the normal learning data base 34 as shown in Table 2 below. (This shows that the added function provided in the receiving port state identifying section 20 does not affect the usual learning function.)

TABLE 2

Normal Learning Data Base 34 (N6)

| | Destination MAC address | Transmitting port number | Disable *1 | Port state *2 | Root *3 | Designated *4 | Aging timer | Learning mode *5 | Bypass route *6 | Switched port *7 | |
|---|---|---|---|---|---|---|---|---|---|---|---|
| Search by destination MAC address | b | P20 | 0 | 3 | 0 | 1 | 300 | 0 | 0 | 0 | |
| | 0 | 0 | 1 | 0 | 0 | 0 | 0 | 0 | 0 | 0 | (Initial value) |
| | • | • | • | • | • | • | • | • | • | • | |
| | • | • | • | • | • | • | • | • | • | • | |

Notes

*1: Disabled state 1, otherwise 0.

*2: Valid only when not in disabled state. Blocking state 0, Listening state 1, Learning state 2, Forwarding state 3.

*3: Valid only when not in disabled state. Root port 1, otherwise 0.

*4: Valid only when not in disabled state. Designated port 1, otherwise 0.

*5: 0 when in permanent learning state from beginning, 1 when switched from temporary learning state.

*6: 1 if bypass route has ever been used with destination MAC address as transmitting source terminal, otherwise 0.

*7: 1 when relearned from root port to designated port, 0 when learned on designated port from beginning.

Figure 8:
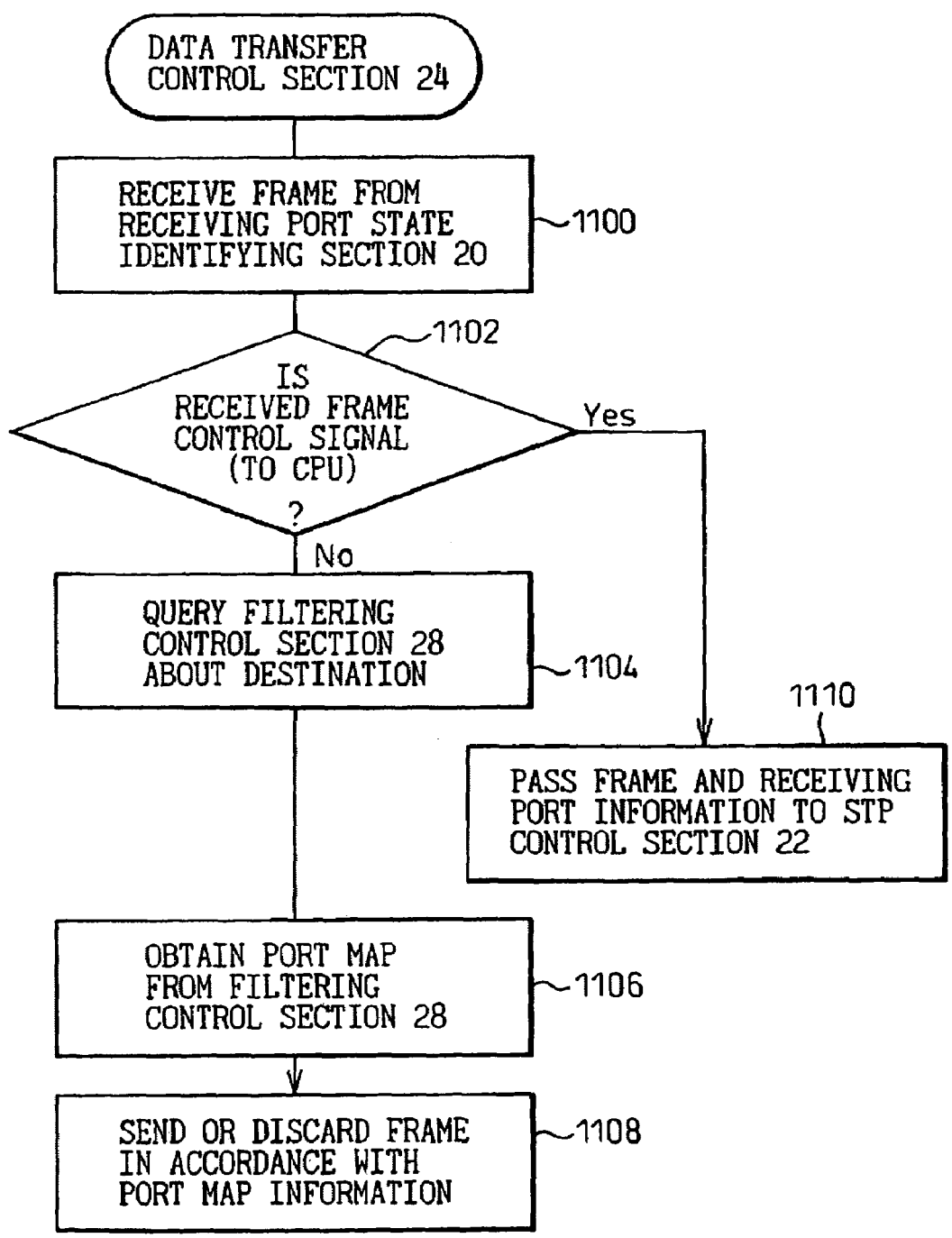
FIG. 8 is a flowchart showing the processing performed in a data transfer control section 24.

The data transfer control section 24 performs processing in accordance with the flow of FIG. 8; that is, the data transfer control section 24 queries the filtering control section 28 for the path (learning) information concerning the frame whose receiving port is the port P20 and whose destination address is a (step 1104). In accordance with the flow of FIG. 9, the filtering control section 28 first refers to the receiving port state identification table 38 by using the receiving port number as the search key, and identifies the state of the receiving port. Rather than searching through the receiving port state identification table 38, information with the port state added as header information at the beginning of the frame may be sent from the data transfer control section 24. In the example shown here, since the port P20 is in the forwarding state, path information search is conducted by referring to the normal learning data base 34, whose contents are shown in Table 2, and the temporary learning data base 36, whose contents are shown in Table 3, by using the destination MAC address of the received frame as the search key in accordance with the flow shown in FIGS. 10 and 11.

TABLE 3

Temporary Learning Data Base 36 (N6)

| | MAC address | Temporary learning port number | Disable *1 | Port state *2 | Aging timer | |
|---|---|---|---|---|---|---|
| Search by MAC address | 0 | 0 | 0 | 0 | 0 | (Initial value) |
| | . | . | . | . | . | |
| | . | . | . | . | . | |
| | . | . | . | . | . | |

Notes
*1: Disabled state 1, otherwise 0.
*2: Valid only when not in disabled state. Blocking state 0, Listening state 1, Learning state 2, Forwarding state 3.

Figure 10:
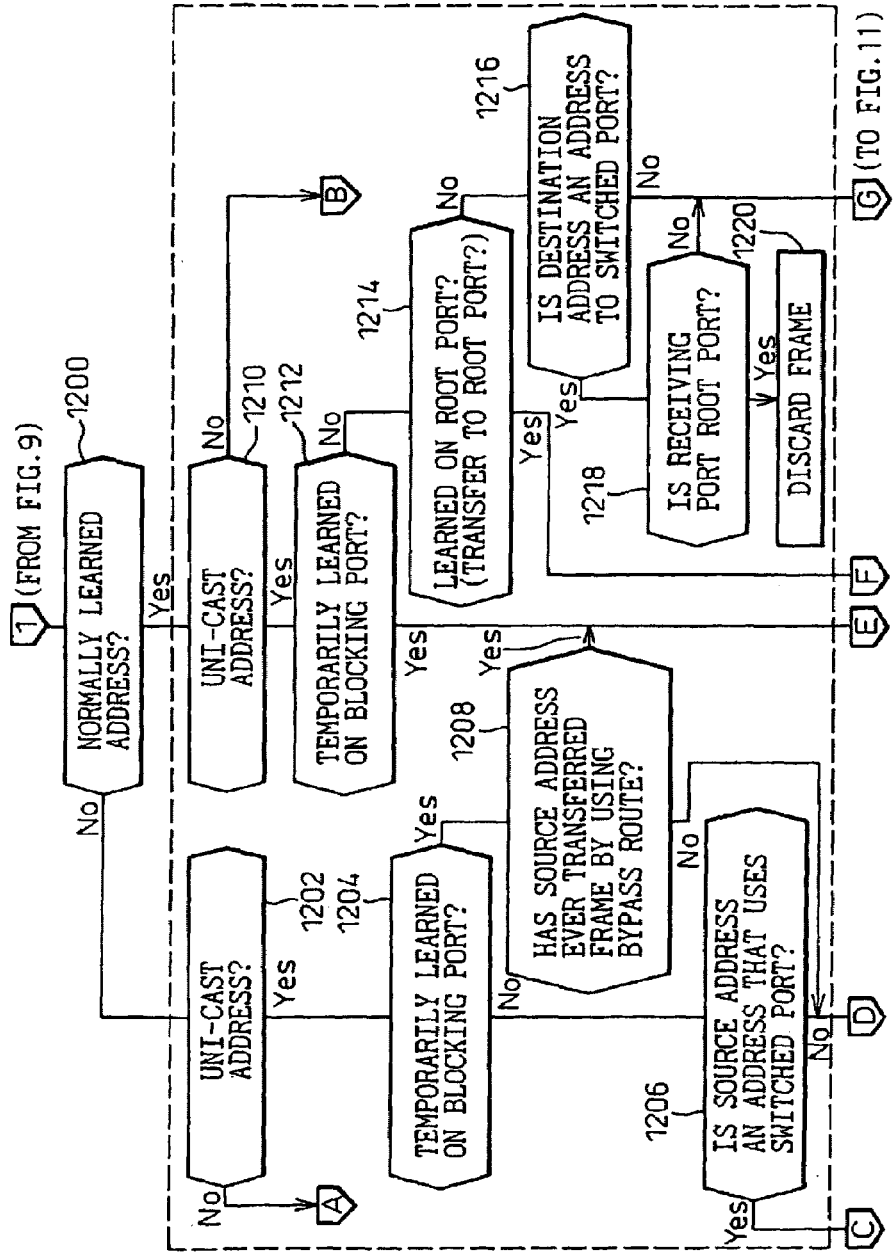
FIG. 10 is a flowchart showing a second part of the processing performed in the filtering control section 28.
Figure 11:
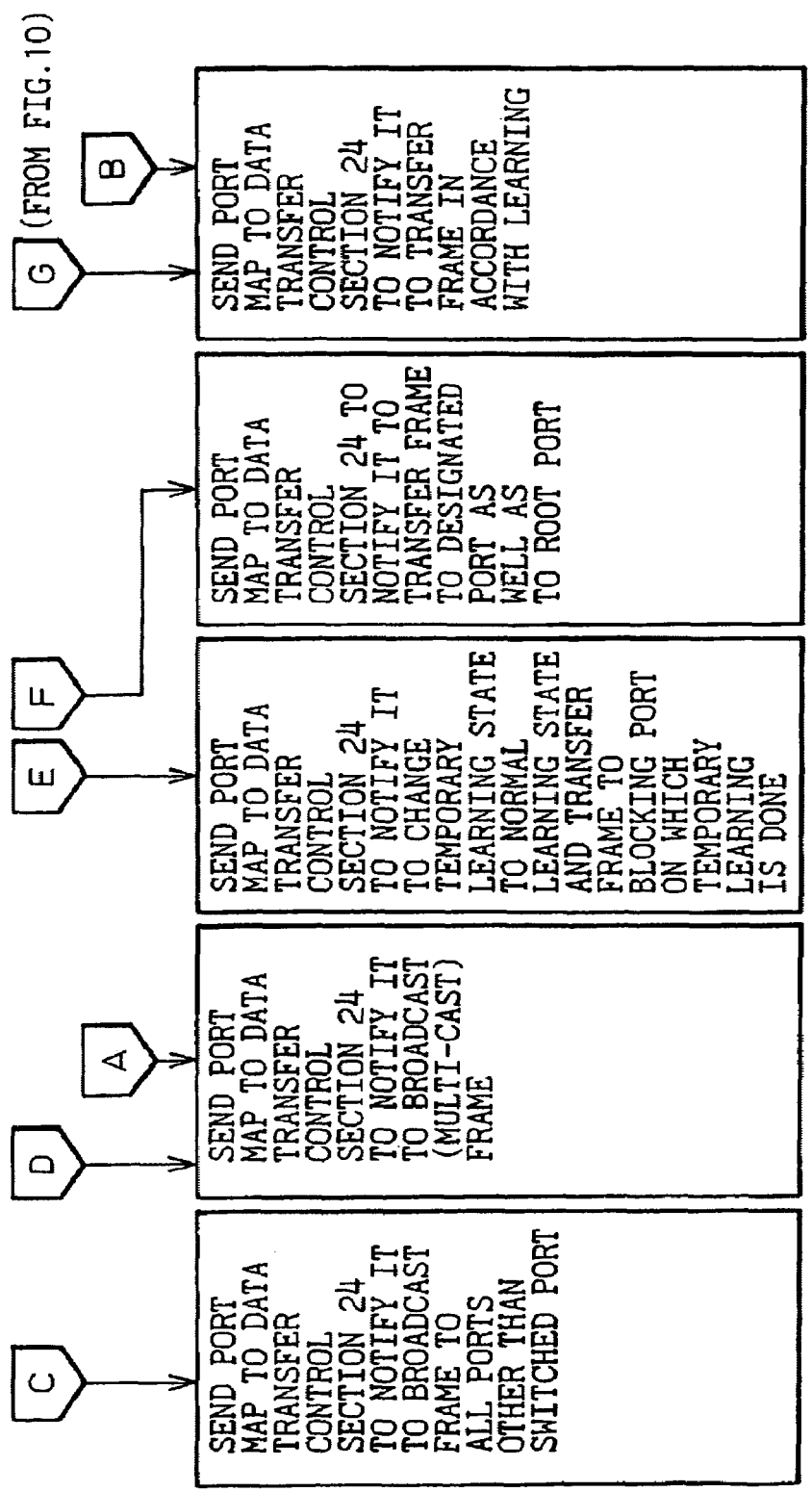
FIG. 11 is a flowchart showing a third part of the processing performed in the filtering control section 28.

In FIG. 10, the processing flow enclosed by dashed lines is the flow added in the present invention; according to Table 2 and Table 3, as the address a is neither learned nor temporarily learned on any port, the process proceeds in the order of steps 1200, 1202, 1204, 1206, and D in FIGS. 10 and 11, and port map information that indicates broadcasting to all the ports other than the receiving port is passed to the data transfer control section 24. (This shows that the added function provided in the filtering control section 28 does not affect the usual filtering function when address learning is not done.)

In accordance with the port map, the data transfer control section 24 copies the frame α and transfers the copies to the transmitting port state identifying sections 26 for the port P17, port P18, and port P19, respectively (step 1108 in FIG. 8).

Figure 14:
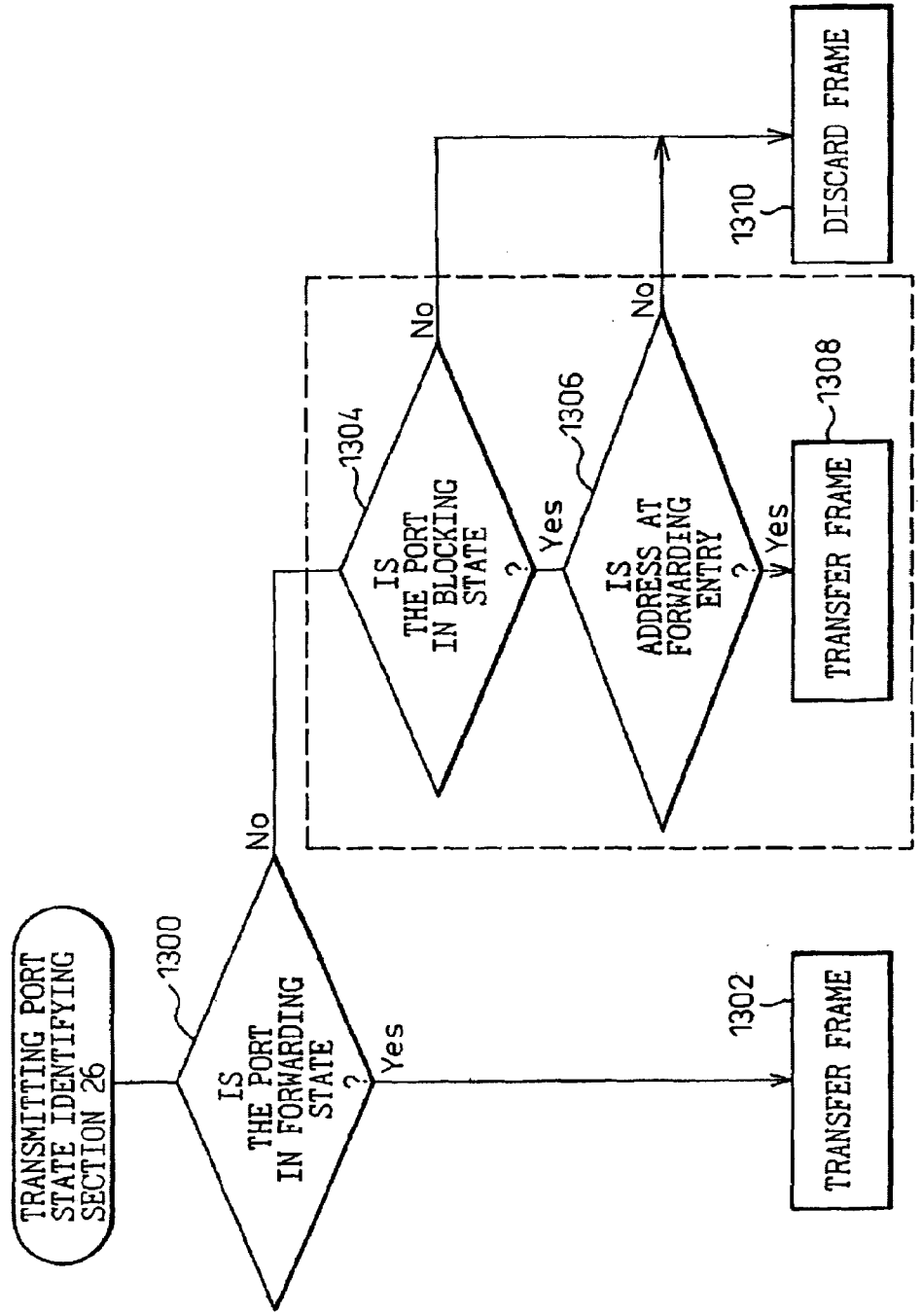
FIG. 14 is a flowchart showing the processing performed in a transmitting port state identifying section 26.

The transmitting port state identifying section 26 for each port refers to a transmitting port state identification table 40 whose contents are shown in Table 4, by using the transmitting port number as the search key, and identifies the state of the port in accordance with the flow shown in FIG. 14. According to Table 4, as the ports P17, P18, and P19 are all in the forwarding state, the process proceeds from step 1300 to step 1302, and the frame α is transmitted from all the three ports.

TABLE 4

Transmitting Port State Identification Table 40

| | Transmitting port number | Disable *1 | Port state *2 | MAC address *3 | |
|---|---|---|---|---|---|
| | P17 | 0 | 3 | 0 | |
| | | | | . | |
| | | | | . | |
| | P18 | 0 | 3 | 0 | |
| | | | | . | |
| | | | | . | |
| Indexed by transmitting port number | P19 | 0 | 3 | 0 | |
| | | | | . | |
| | | | | . | |
| | P20 | 0 | 3 | 0 | |
| | | | | . | |
| | | | | . | |
| | 0 | 1 | 0 | 0 | (Initial value) |
| | | | | . | |
| | | | | . | |
| | . | . | . | . | |
| | . | . | . | . | |
| | . | . | . | . | |

Notes
*1: Disabled state 1, otherwise 0.
*2: Valid only when not in disabled state. Blocking state 0, Listening state 1, Learning state 2, Forwarding state 3.
*3: MAC address switched from temporary learning to permanent learning.

Turning back to FIG. 6, the frame α transmitted from the port P17 is received by the port P12 on the bridge N5, and transmitted out from its ports P11 and P13 by the same processing as performed in the bridge N6.

An explanation will be given here of why the blocking port temporary learning function 16 in FIG. 3 does not operate unless the address learning is done. The frames α transmitted from the ports P18 and P19 are received by the port P15 on the bridge N7 and the port P22 on the bridge N8, respectively, and the receiving port state is identified by the receiving port state identifying section 20 in each receiving bridge in accordance with the flow of FIG. 7. Here, steps 1000, 1002, 1004, and 1006 are carried out in this order, and the address information is passed to the temporary address learning control section 32; in the temporary address learning control section 32, however, as the destination address a is not normally learned on any other port, steps 1400, 1402, 1404, and 1412 are carried out in this order in accordance with the flow shown in FIG. 15, and temporary learning is not performed. Further, in the filtering control section 28, it is determined that the frame α has been received by the blocking port, and the frame α is therefore discarded in accordance with steps 1502 and 1508 in FIG. 13. This shows that when a bypass route is not constructed, the usual blocking function is working.

Thereafter, the same processing is repeated, and the frame α is forwarded to the terminal A by passing through the bridge N2, bridge N1, bridge N3, bridge N4, bridge N7, and bridge N9 in the order stated.

In the course of the above processing, the port P28 on the bridge N10, the port P20 on the bridge N6, the port P12 on the bridge N5, the port P8 on the bridge N2, the port P2 on the bridge N1, the port P3 on the bridge N3, the port P9 on the bridge N4, the port P14 on the bridge N7, the port P24 on the bridge N9, and the port P21 on the bridge N8 learn the address b of the terminal B. The transfer of the frame α and the result of the learning of the MAC address b done on each port are shown in FIG. 6. For example, "P20-(b)" in the figure shows that the port P20 has learned the MAC address b of the terminal B.

Figure 16:
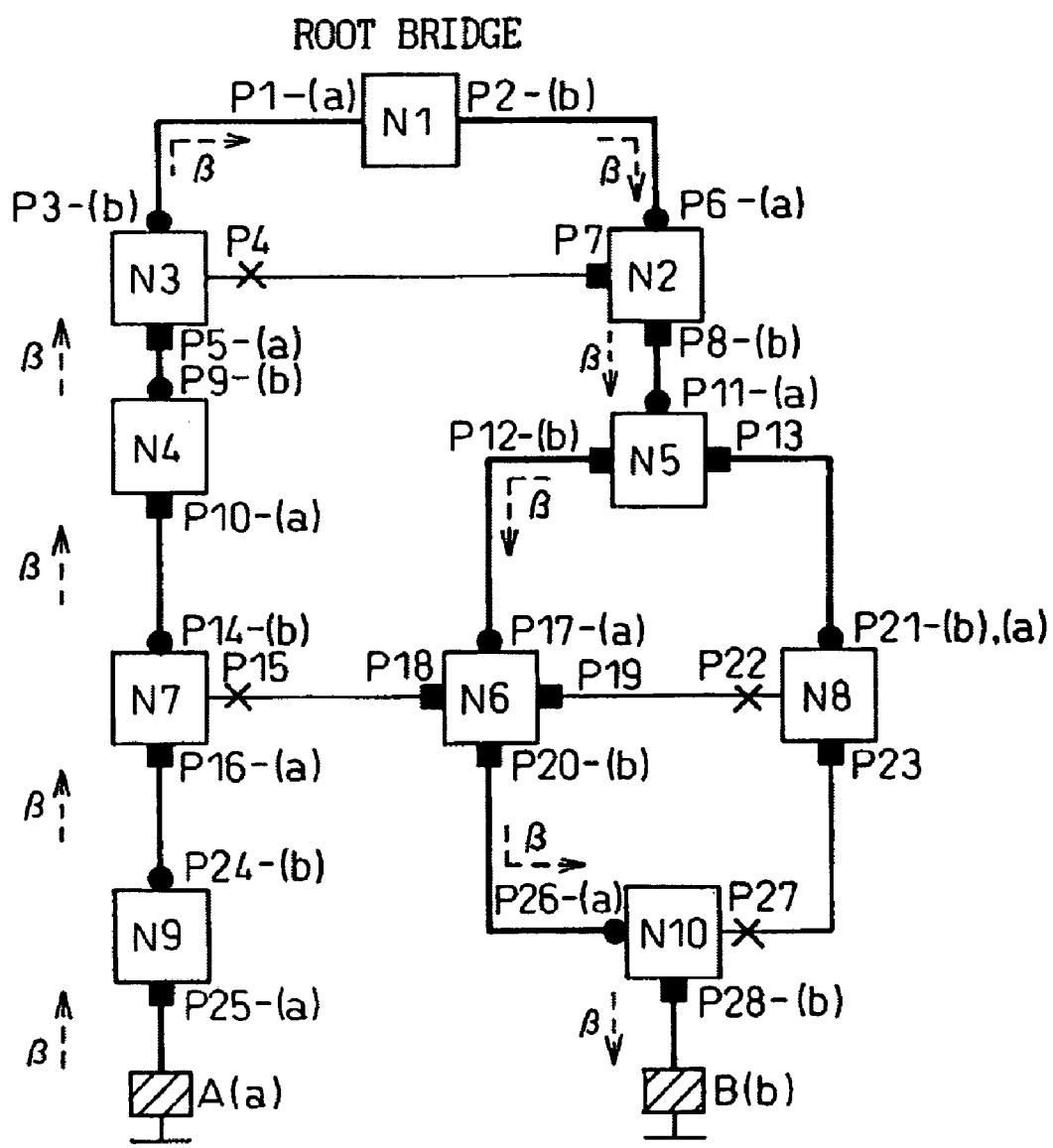
FIG. 16 is a diagram showing a second process of address learning in the network of FIG. 5.

Next, an explanation will be given of how the temporarily learned address-based data transfer function 18 does not operate when the terminal A first transmits the frame β addressed to the terminal B (as a response to the frame α) as shown in FIG. 16, that is, how the frame β is transferred and the address a learned without affecting the usual blocking function.

The bridge N9 receives the frame β on its port P25; here, as the MAC address b of the terminal B is already learned on the port P24 during the transfer of the frame a from the terminal B to the terminal A as described above, the frame β with source address a and destination address b is sent out from the port P24 toward the bridge N7.

The bridge N7 receives the frame β on its port P16. The port P15 is a blocking port, but temporary learning is not done on this port; therefore, the frame β is sent out from the port P14 on which the address b is learned. This means that the usual blocking function is working.

Thereafter, with the same processing as performed in the bridges N9 and N7, the frame β is transmitted toward the terminal B by passing through the bridge N4, bridge N3, bridge N1, bridge N2, bridge N5, bridge N6, and bridge N10 in the order stated.

In the course of the above processing, the port P25 on the bridge N9, the port P16 on the bridge N7, the port P10 on the bridge N4, the port P5 on the bridge N3, the port P1 on the bridge N1, the port P6 on the bridge N2, the port P11 on the bridge N5, the port P17 on the bridge N6, and the port P26 on the bridge N10 learn the address a of the terminal A. The result of the learning of the MAC address a done on each port during the transfer of the frame β is shown in FIG. 16.

The above processing results are the same as the frame transfer processing results obtained in the prior art network constructed with bridges where the path is determined in accordance with a spanning tree, and thus it can be seen that address learning in both directions can be done without being affected by the functions added in the present invention. It is also shown that when the is address learning is not done, a bypass route is not constructed.

Next, referring to FIG. 17, an explanation will be given of how the bridge N6 transfers the data also to its designated port and the bridge N7 performs temporary learning on its port P15 by the added functions of the present invention, that is, the designated port data transfer function 14 and the blocking port temporary learning function 16 in FIG. 3, after the addresses of the terminals A and B have been learned on each bridge along the path.

Figure 17:
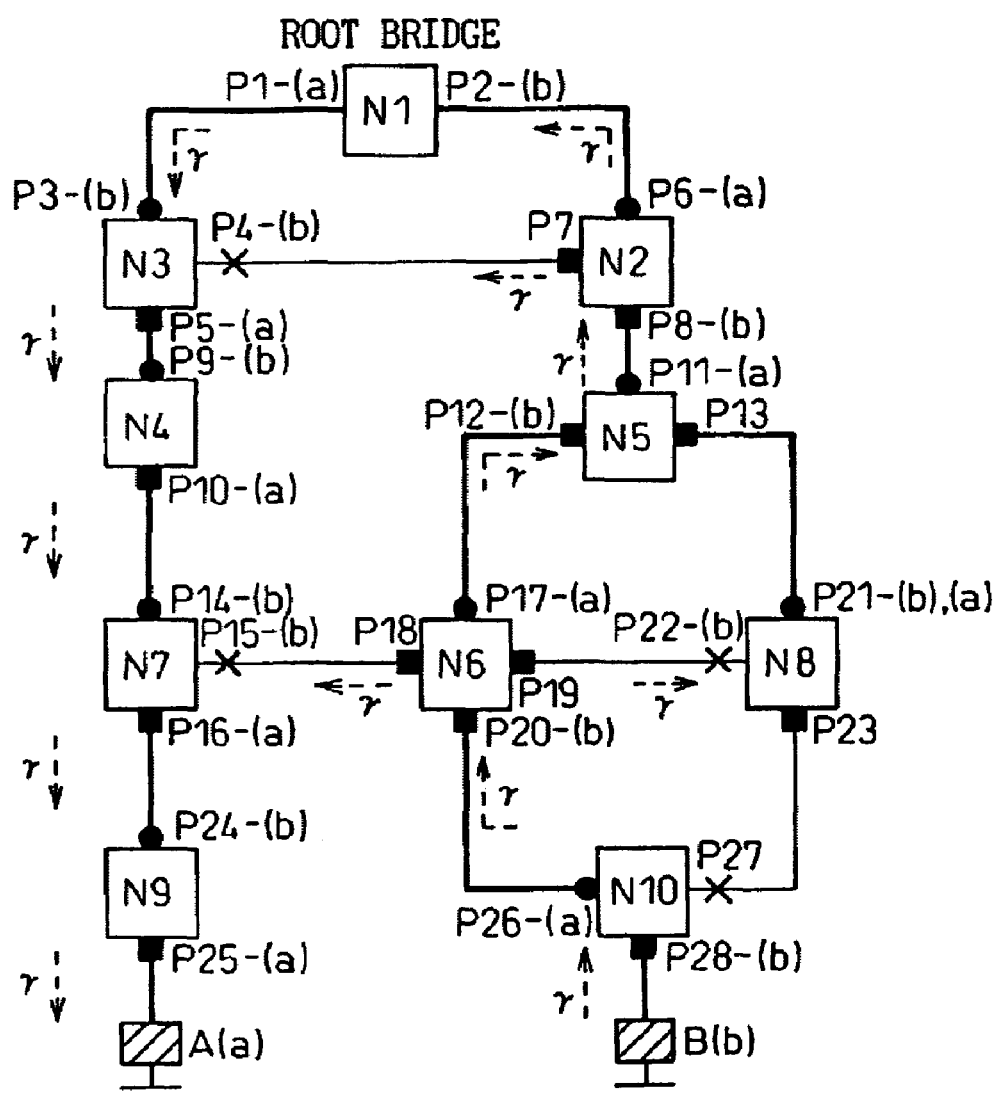
FIG. 17 is a diagram for explaining the process up to temporary learning.

In FIG. 17, when a frame γ addressed to the terminal A is transmitted out from the terminal B, the bridge N10 receives it on its port P28 and, in accordance with the address learning, transmits the frame γ with source address b and destination address a toward the bridge N6. The transfer operation will not be described here, but will be described in detail with reference to the next bridge N6.

Next, an explanation will be given of how the designated port data transfer function 14 operates in the bridge N6.

When the bridge N6 receives the frame γ on its port P20, the receiving port state identifying section 20 refers to the receiving port state identification table 38 whose contents are shown in Table 1 by using the receiving port number as the search key, and identifies the state of the receiving port in accordance with the flow shown in FIG. 7. According to Table 1, as the port P20 is in the forwarding state, the frame γ is processed in steps 1000, 1002, 1004, 1008, 1010, and 1012 in this order, and transferred to the data transfer control section 24. At this time, relearning of the address b is performed in the address learning control section 30.

The data transfer control section 24 performs processing in accordance with the flow of FIG. 8; that is, the data transfer control section 24 queries the filtering control section 28 for the path (learning) information concerning the frame whose receiving port is the port P20 and whose destination address is a (step 1104). In the same manner as when receiving the frame α, the filtering control section 28 first refers to the receiving port state identification table 38 by using the receiving port number as the search key, and performs the processing shown in FIG. 9. In this processing, as the port P20 is found to be a forwarding port, the process branches to the flow of FIG. 10, where path information search is conducted by referring to the normal learning data base 34 and the temporary learning data base 36 by using the destination MAC address of the received frame as the search key. In FIGS. 10 and 11, since normal learning of the address a is done on the root port, the process proceeds in the order of steps 1200, 1210, 1212, 1214, and F, and port map information that indicates transferring the data to the learned root port and the designated ports is passed to the data transfer control section 24.

In accordance with the port map, the data transfer control section 24 copies the frame γ and transfers the copies to the transmitting port state identifying sections 26 for the port P17, port P18, and port P19, respectively. The transmitting port state identifying section 26 for each port refers to the transmitting port state identification table 40 by using the transmitting port number as the search key, and identifies the state of the port in accordance with the flow shown in FIG. 14. Since the ports P17, P18, and P19 are all in the forwarding state, the process proceeds from step 1300 to step 1302, and the frame γ is transmitted from all the three ports.

The frame γ sent out from the port P17 is received on the port P12 of the bridge N5, and the received frame is sent out from the port P11 in accordance with the address learning.

An explanation will be given of how the blocking port temporary learning function 16 operates in the bridge N7 (and the bridge N8).

The frames γ sent out from the ports P18 and P19 are received by the port P15 on the bridge N7 and the port P22 on the bridge N8, respectively, and the receiving port state is identified by the receiving port state identifying section 20 in each receiving bridge in accordance with the flow of FIG. 7. As, in either case, the receiving port is in the blocking state, address information, i.e., destination address, source address, and receiving port information, is passed to the temporary address learning control section 32 (step 1006).

Figure 12:
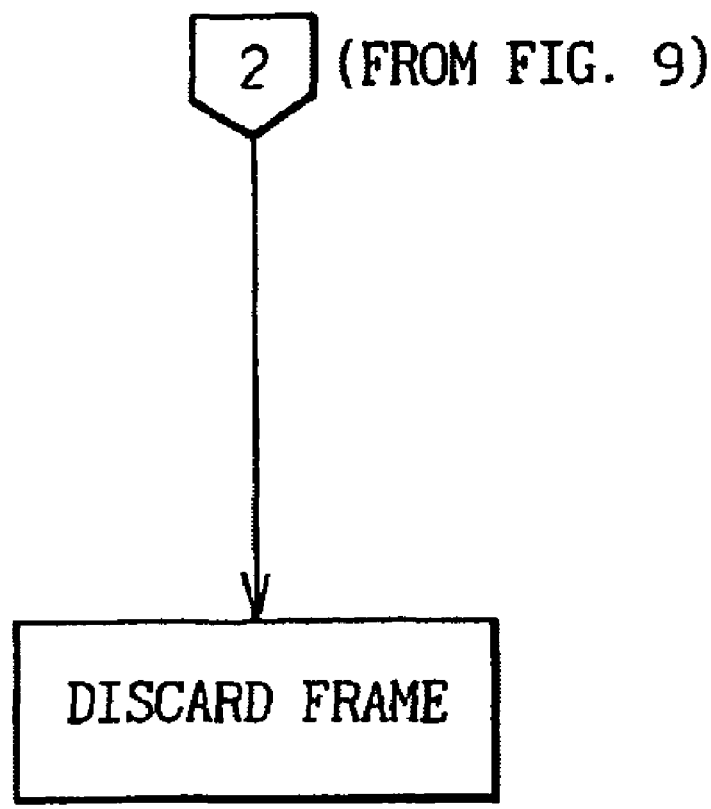
FIG. 12 is a flowchart showing a fourth part of the processing performed in the filtering control section 28.
Figure 13:
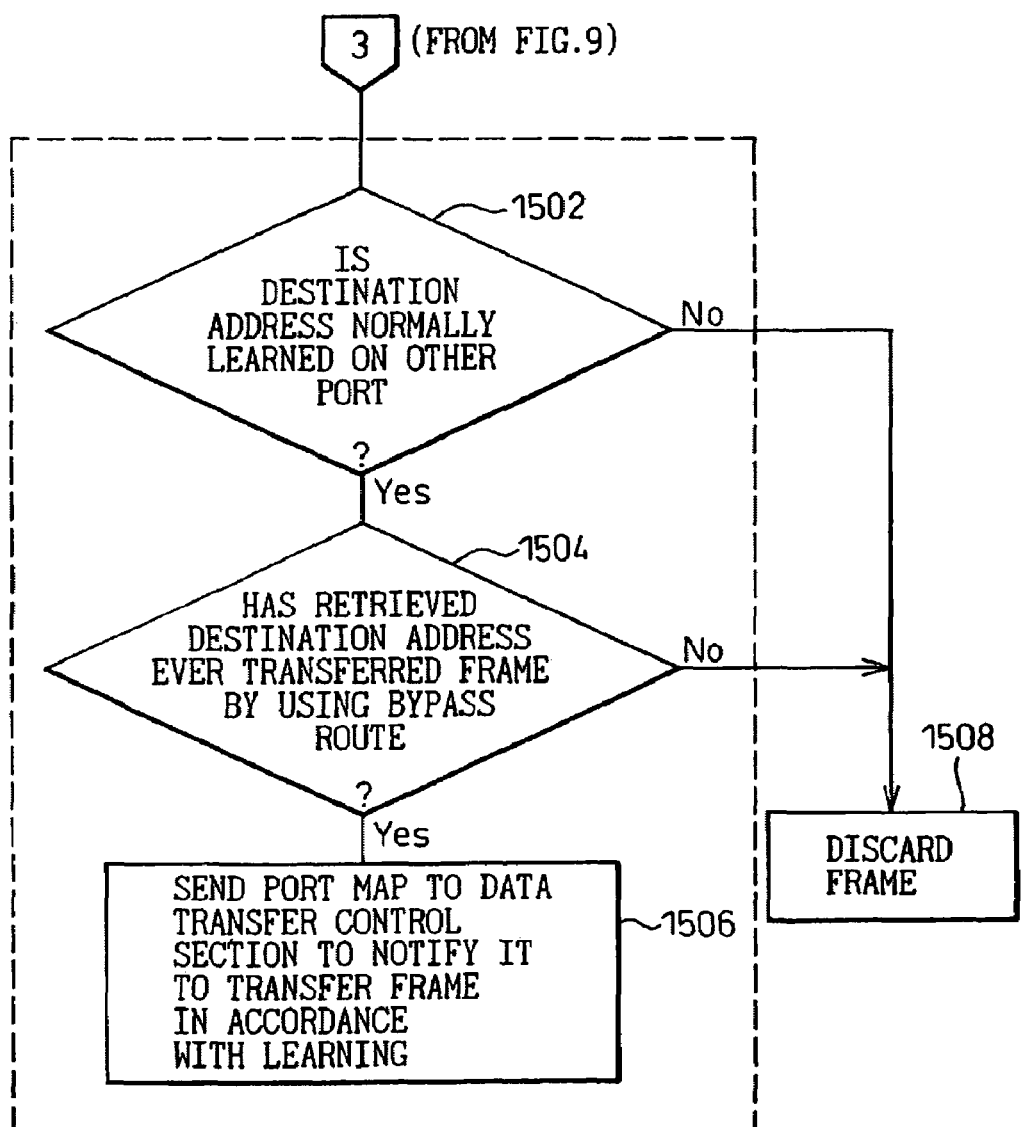
FIG. 13 is a flowchart showing a fifth part of the processing performed in the filtering control section 28.

(The frame γ is discarded in accordance with the processes of FIGS. 12 and 13 performed by the filtering control section 28. That is, the usual blocking function is working.)

Figure 15:
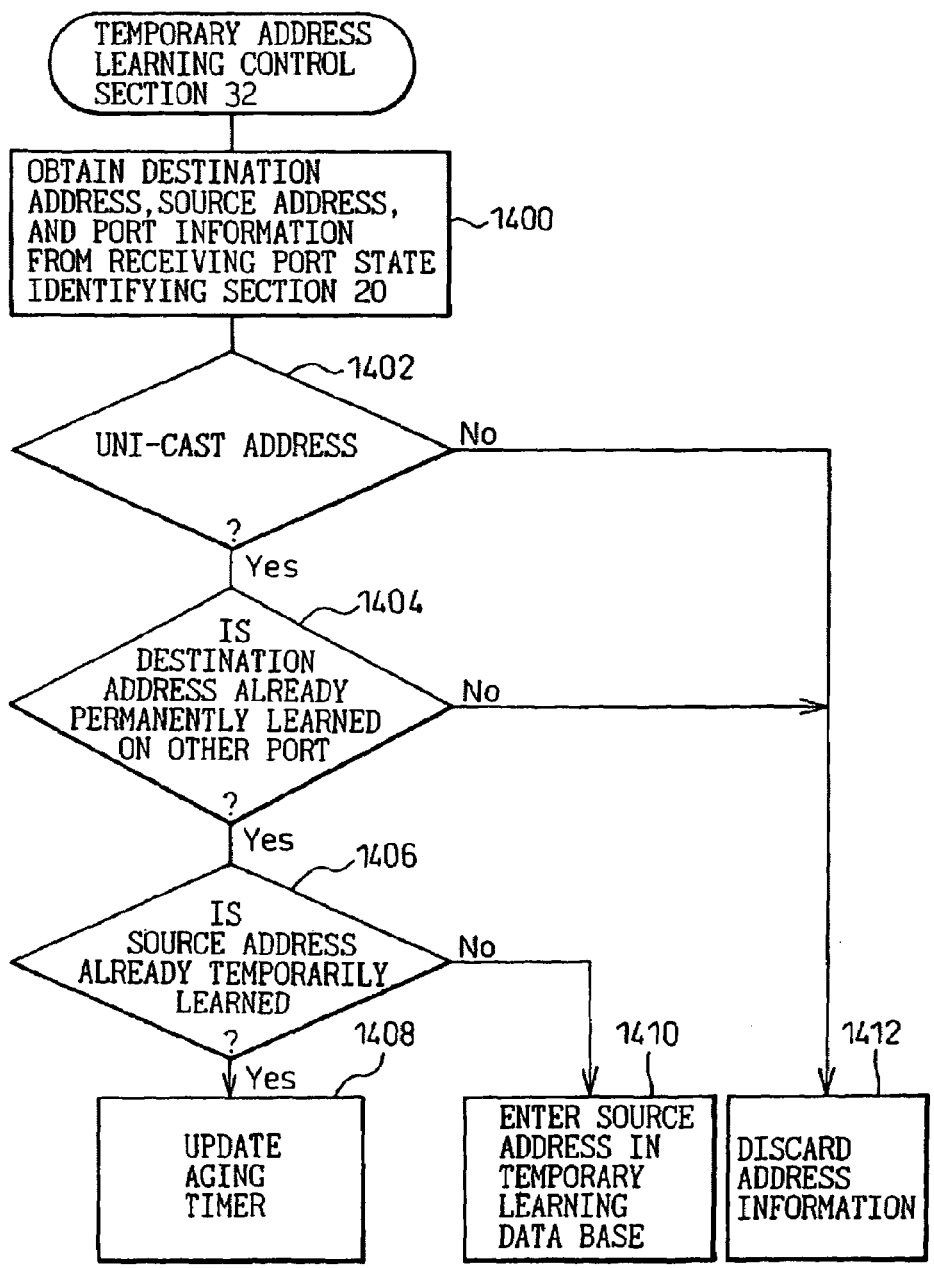
FIG. 15 is a flowchart showing the processing performed in a temporary address learning control section 32.

The temporary address learning control section 32 refers to the normal learning data base 34 whose contents are shown in Table 5 by using the destination MAC address as the search key, and determines in accordance with the flow of FIG. 15 whether temporary learning is to be done or not. Since the destination address a is already learned on the port P16, the process proceeds in the order of steps 1400, 1402, 1404, 1406, and 1410, and the source address b is temporarily learned on the port P15 and entered into the temporary learning data base 36 as shown in Table 6.

of the present invention, that is, the temporarily learned address-based data transfer function 18 shown in FIG. 3, when the address b is temporarily learned in the bridges N7 and N3.

Figure 18:
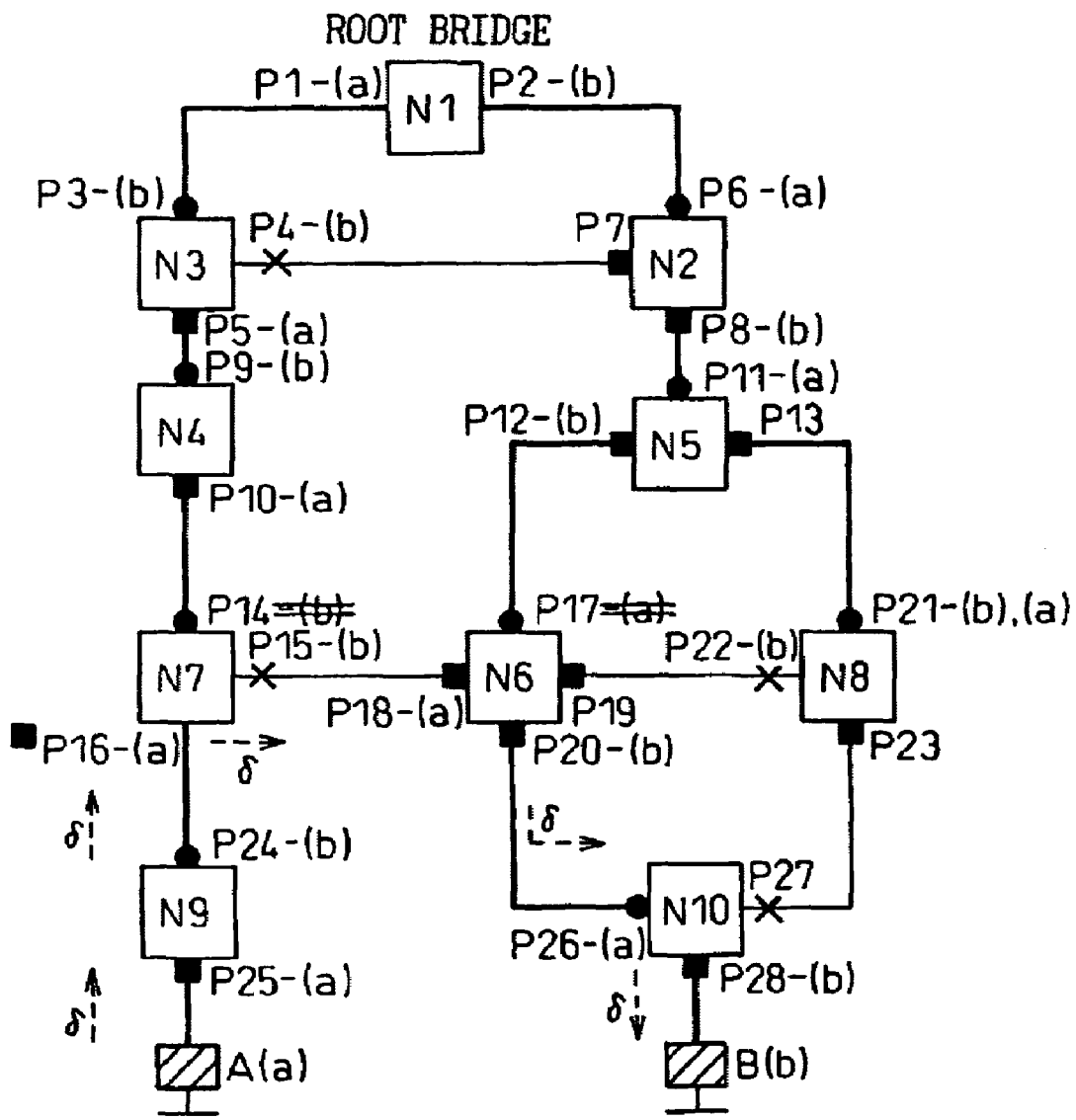
FIG. 18 is a diagram for explaining the process up to the formation of a bypass route.

In FIG. 18, when a frame δ addressed to the terminal B is transmitted out from the terminal A, the bridge N9 receives the frame on its port P25 and, in accordance with the address learning, transmits the frame δ with source address a and destination address b from its port P24 toward the bridge N7. The transfer operation performed in the bridge N9 is the same as the usual bridge operation, and therefore will not be described here.

It will be explained here how the temporarily learned address-based data transfer function 18 operates in the

TABLE 5

Permanent learning Data Base 34 (N7)

|  | Destination MAC address | Transmitting port number | Disable *1 | Port state *2 | Root *3 | Designated *4 | Aging timer | Learning mode *5 | Bypass route *6 | Switched port *7 |  |
|---|---|---|---|---|---|---|---|---|---|---|---|
| Search by destination MAC address | b | P14 | 0 | 3 | 1 | 0 | 300 | 0 | 0 | 0 |  |
|  | b | P15 | 0 | 0 | 0 | 0 | 300 | 1 | 0 | 1 |  |
|  | a | P16 | 0 | 3 | 0 | 1 | 300 | 0 | 0 | 0 |  |
|  | 0 | 0 | 1 | 0 | 0 | 0 | 0 | 0 | 0 | 0 | (Initial value) |
|  | . | . | . | . | . | . | . | . | . | . |  |
|  | . | . | . | . | . | . | . | . | . | . |  |
|  | . | . | . | . | . | . | . | . | . | . |  |

Notes
*1: Disabled state 1, otherwise 0.
*2: Valid only when not in disabled state. Blocking state 0, Listening state 1, Learning state 2, Forwarding state 3.
*3: Valid only when not in disabled state. Root port 1, otherwise 0.
*4: Valid only when not in disabled state. Designated port 1, otherwise 0.
*5: 0 when in permanent learning state from beginning, 1 when switched from temporary learning state.
*6: 1 if bypass route has ever been used with destination MAC address as transmitting source terminal, otherwise 0.
*7: 1 when relearned from root port to designated port, 0 when learned on designated port from beginning.

TABLE 6

Temporary Learning Data Base 36 (N7)

|  | MAC address | Temporary learning port number | Disable *1 | Port state *2 | Aging timer |  |
|---|---|---|---|---|---|---|
| Search by MAC address | b | P15 | 0 | 0 | 300 |  |
|  | 0 | 0 | 0 | 0 | 0 | (Initial value) |
|  | . | . | . | . | . |  |
|  | . | . | . | . | . |  |
|  | . | . | . | . | . |  |

Notes
*1: Disabled state 1, otherwise 0.
*2: Valid only when not in disabled state. Blocking state 0, Listening state 1, Learning state 2, Forwarding state 3.

In the bridge N2, when the frame γ is received on the port P8, the frame γ is also transferred to the port P7, as is done in the bridge N6, and in the bridge N3, the source address b is temporarily learned on the port P4, as is done in the bridge N7. (The frame γ received on the port P4 is discarded.)

Thereafter, the frame γ is passed through the bridge N1, bridge N3, bridge N4, bridge N7, and bridge N9 in this order, and delivered to the terminal A. The transfer of the frame γ and the result of the temporary learning of the MAC address b done on each blocking port are shown in FIG. 17.

Next, referring to FIG. 18, an explanation will be given of how the bypass route is constructed using the added function bridge N7. When the bridge N7 receives the frame δ at its port P16, the receiving port state identifying section 20 refers to the receiving port state identification table 38 whose contents are shown in Table 7 by using the receiving port number as the search key, and identifies the state of the receiving port in accordance with the flow shown in FIG. 7. Here, it is determined that the receiving port is not a blocking port, and therefore, the frame δ is sent to the data transfer control section 24 (step 1012).

TABLE 7

Receiving Port State Identification Table 38 (N7)

|  | Receiving port number | Disable *1 | Port state *2 | Bypass route *3 |  |
|---|---|---|---|---|---|
| Indexed by receiving port number | P14 | 0 | 3 | 0 |  |
|  | P15 | 0 | 0 | 0 |  |
|  | P16 | 0 | 3 | 0 |  |
|  | 0 | 1 | 0 | 0 |  |
|  | . | . | . | . | (Initial value) |
|  | . | . | . | . |  |
|  | . | . | . | . |  |

Notes
*1: Disabled state 1, otherwise 0.
*2: Valid only when not in disabled state. Blocking state 0, Listening state 1, Learning state 2, Forwarding 5 state 3.
*3: Valid only when in blocking state. 1 if there is a bypass route, 0 if there is no bypass route.

In accordance with the flow of FIG. 8, the data transfer control section 24 queries the filtering control section 28 for the path information concerning the destination address b (step 1104). The filtering control section 28 first refers to the receiving port state identification table 38 (N7) whose contents are shown in Table 7 by using the receiving port number as the search key, and performs the processing shown in FIG. 9. In this processing, as the port P16 is found to be a forwarding port, the process branches to the flow of FIG. 10, where the path information search of FIG. 10 is conducted by referring to the normal learning data base 34 whose contents are shown in Table 5 by using the destination MAC address of the received frame as the search key. Since it is found that the destination address b is learned on the port P14 (step 1200), the temporary learning data base 36 (N7) of Table 6 is searched by using the destination address b as the search key, to determine whether or not temporary learning is done on the blocking port (step 1212). As it can be determined here that the destination address b is temporarily learned on the port P15, the process proceeds to E in FIG. 11, and the learned contents concerning the destination address b in the temporary learning table are copied to the normal learning table as shown in Table 8. That is, the temporary learning state is changed to the normal learning state, and port map information indicating transfer to the blocking port P15 is passed to the data transfer control section 24. At this time, the bypass route bit for the destination MAC address a in the normal learning data base 34 is set to 1 to indicate that the bypass route is used, and the switched port bit for the destination MAC address b for which the port information has been changed is also set to "1" to indicate that the path has been switched from the root port (Table 8). Further, the destination address b switched to the normal learning state is entered in the transmitting port state identification table 40, as shown in Table 9. The contents of the temporary learning data base for the address switched to the normal learning state are deleted when the corresponding contents in the normal learning data base are deleted.

TABLE 9

Transmitting Port State Identification table 40 (N7)

| | Transmitting port number | Disable *1 | Port state *2 | MAC address *3 | |
|---|---|---|---|---|---|
| Indexed by transmitting port number | P14 | 0 | 3 | 0 • • | |
| | P15 | 0 | 0 | b 0 • • | |
| | P16 | 0 | 3 | 0 • • | |
| | 0 | 1 | 0 | 0 • • | (Initial value) |
| | • • • | • • • | • • • | • • • | |

Notes

*1: Disabled state 1, otherwise 0.

*2: Valid only when not in disabled state. Blocking state 0, Listening state 1, Learning state 2, Forwarding state 3.

*3: MAC address switched from temporary learning to permanent learning.

In accordance with the port map, the data transfer control section 24 transfers the frame δ to the transmitting port state identifying section 26 for the port P15. Therefore, the frame δ is not transmitted from the port P14 previously used for transmission.

Using the transmitting port state identification table 40 whose contents are shown in Table 9, the transmitting port state identifying section 26 for the port P15 identifies the state of the port by using the transmitting port number as the

TABLE 8

Normal Learning Data Base 34 (N7)

| | Destination MAC address | Transmitting port number | Disable *1 | Port state *2 | Root *3 | Designated *4 | Aging timer | Learning mode *5 | Bypass route *6 | Switched port *7 | |
|---|---|---|---|---|---|---|---|---|---|---|---|
| Searched by destination MAC address | b | P15 | 0 | 0 | 0 | 0 | 300 | 1 | 0 | 1 | |
| | a | P16 | 0 | 3 | 0 | 1 | 300 | 0 | 1 | 0 | |
| | 0 | 0 | 1 | 0 | 0 | 0 | 0 | 0 | 0 | 0 | (Initial value) |
| | • | • | • | • | • | • | • | • | • | • | |
| | • | • | • | • | • | • | • | • | • | • | |
| | • | • | • | • | • | • | • | • | • | • | |

Notes

*1: Disabled state 1, otherwise 0.

*2: Valid only when not in disabled state. Blocking state 0, Listening state 1, Learning state 2, Forwarding state 3.

*3: Valid only when not in disabled state. Root port 1, otherwise 0.

*4: Valid only when not in disabled state. Designated port 1, otherwise 0.

*5: 0 when in permanent learning state from beginning, 1 when switched from temporary learning state.

*6: 1 if bypass route has ever been used with destination MAC address as transmitting source terminal, otherwise 0.

*7: 1 when relearned from root port to designated port, 0 when learned on designated port from beginning.

search key in accordance with the flow of FIG. 14; though the port is a blocking port, as there is a normal learning entry for the address b, the frame δ is sent out from the port P15 (step 1308).

As the frame δ is received on the port P18, the bridge N6 relearns that the source address a has been moved to the path of the port P18 as shown in Table 10 by the existing bridge processing, and sends out the frame δ from the port P20. At this time, the switched port bit for the destination MAC address a for which the port information has been changed is set to "1" to indicate that the path has been switched from the root port.

that the terminal A has been used the bypass route (step 1504) because the bypass route for the destination address a is set to "1", as a result of which port map information indicating transfer to the port P16 is passed to the data transfer control section 24.

The data transfer control section 24 transfers the frame to the transmitting port state identifying section 26 for the port P16 in accordance with the port map. The transmitting port state identifying section 26 determines that the port P16 is not in the blocking state, so that the frame is transmitted to the bridge N9.

TABLE 10

Normal Learning Data Base 34 (N6)

| | Destination MAC address | Transmitting port number | Disable *1 | Port state *2 | Root *3 | Designated *4 | Aging timer | Learning mode *5 | Bypass route *6 | Switched port *7 | |
|---|---|---|---|---|---|---|---|---|---|---|---|
| Search by destination MAC address | a | P18 | 0 | 3 | 0 | 1 | 300 | 0 | 0 | 1 | |
| | b | P20 | 0 | 3 | 0 | 1 | 300 | 0 | 0 | 0 | |
| | 0 | 0 | 1 | 0 | 0 | 0 | 0 | 0 | 0 | 0 | (Initial value) |
| | . | . | . | . | . | . | . | . | . | . | |
| | . | . | . | . | . | . | . | . | . | . | |
| | . | . | . | . | . | . | . | . | . | . | |

Notes
*1: Disabled state 1, otherwise 0.
*2: Valid only when not in disabled state. Blocking state 0, Listening state 1, Learning state 2, Forwarding state 3.
*3: Valid only when not in disabled state. Root port 1, otherwise 0.
*4: Valid only when not in disabled state. Designated port 1, otherwise 0.
*5: 0 when in permanent learning state from beginning, 1 when switched from temporary learning state.
*6: 1 if bypass route has ever been used with destination MAC address as transmitting source terminal, otherwise 0.
*7: 1 when relearned from root port to designated port, 0 when learned on designated port from beginning.

In the bridge N10, the frame δ received on the port P26 is sent out from the port P28 in accordance with the address learning.

Thereafter, any frame addressed to the terminal A from the terminal B is forwarded to the port P15 on the bridge N7 via the bridge N10 and the bridge N6. In the bridge N7, the receiving port state identifying section 20 for the port P15 refers to the receiving port state identification table 38 (N7) whose contents are shown in Table 7 by using the receiving port number as the search key, and transfers the frame to the data transfer control section 24 in accordance with the processing flow of FIG. 7. The data transfer control section 24 queries the filtering control section 28 in accordance with the processing flow of FIG. 8. The details of the processing have already been described and, therefore, will not be repeated here.

Figure 9:
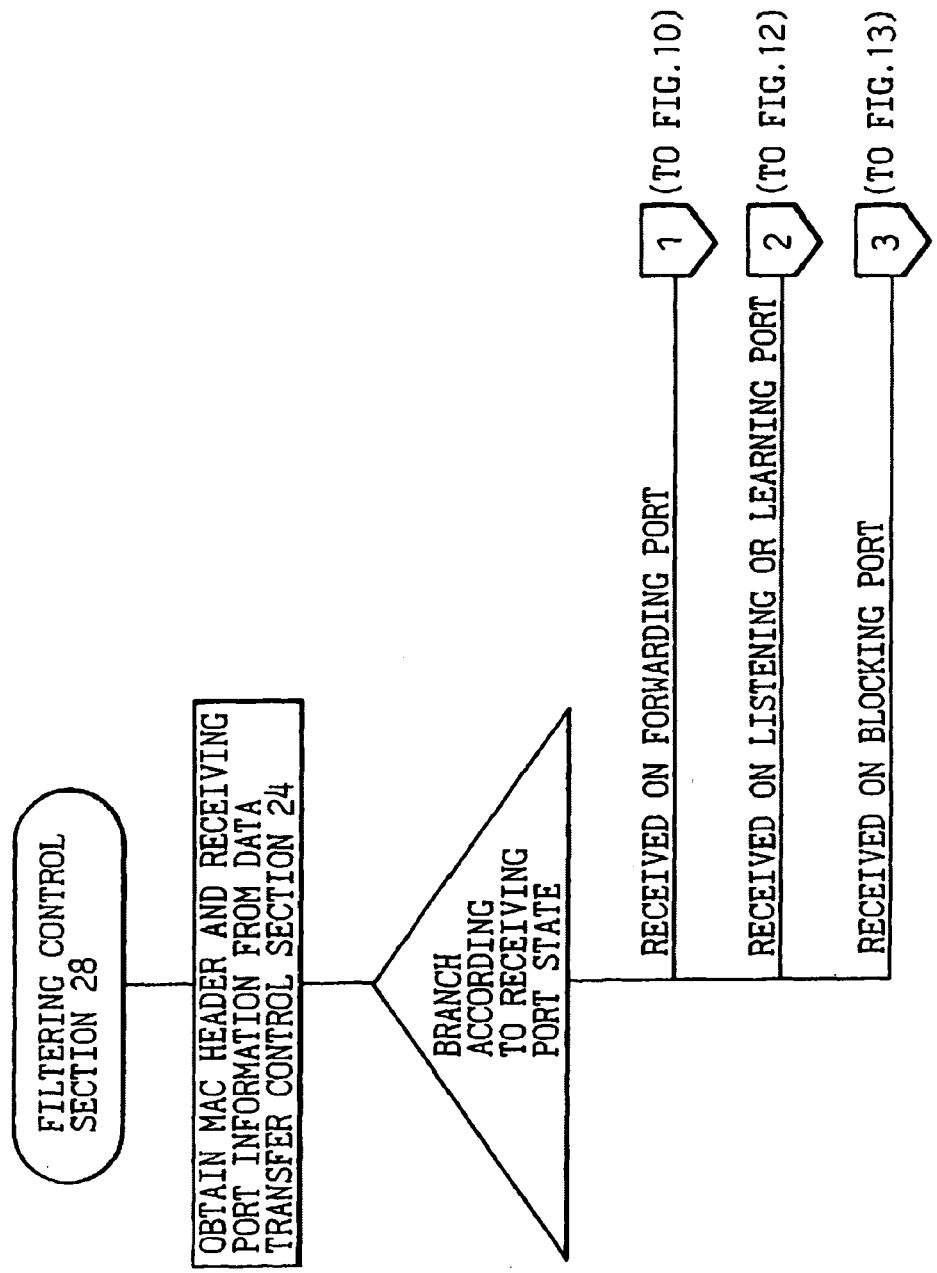
FIG. 9 is a flowchart showing a first part of the processing performed in a filtering control section 28.

The filtering control section 28 first refers to the receiving port state identification table 38 (N7) whose contents are shown in Table 7 by using the receiving port number as the search key, and performs processing in accordance with the processing flow of FIG. 9. As the port P15 is a blocking port as shown in Table 7, the process branches to the flow of FIG. 13, and path information search is conducted by referring to the normal learning data base 34 whose contents are shown in Table 8 by using the destination address as the search key. Here, it is found that the destination address a is normally learned on the port P16 (step 1502), and further, it is found The bridge N9 sends out the frame from its port P25 in accordance with the address learning.

Thereafter, the data addressed to the terminal A from the terminal B is transmitted via the bridge N10, bridge N6, bridge N7, and bridge N9 in this order, while the data addressed to the terminal B from the terminal A is transmitted via the bridge N9, bridge N7, bridge N6, and bridge N10 in this order.

In this way, the bypass route for connecting between the terminal A and the terminal B is constructed between the bridge N6 and the bridge N7.

The transfer of the frame δ and the result of the bypass route construction are shown in FIG. 18. Here, unnecessary learned contents (the learning of the MAC addresses a and b in the bridges N1, N2, N3, N4, N5, and N8) are deleted when the aging timer expires.

When the aging timer has expired because of no communication between the terminals A and B, the learned contents concerning the address b on the ports P15 and P20 and the learned contents concerning the address a on the ports P16 and P18 are deleted, and the bypass route is thus removed; therefore, when resuming the communication, the bypass route will have to be constructed once again in accordance with the procedures described in the above embodiment.

Figure 19:
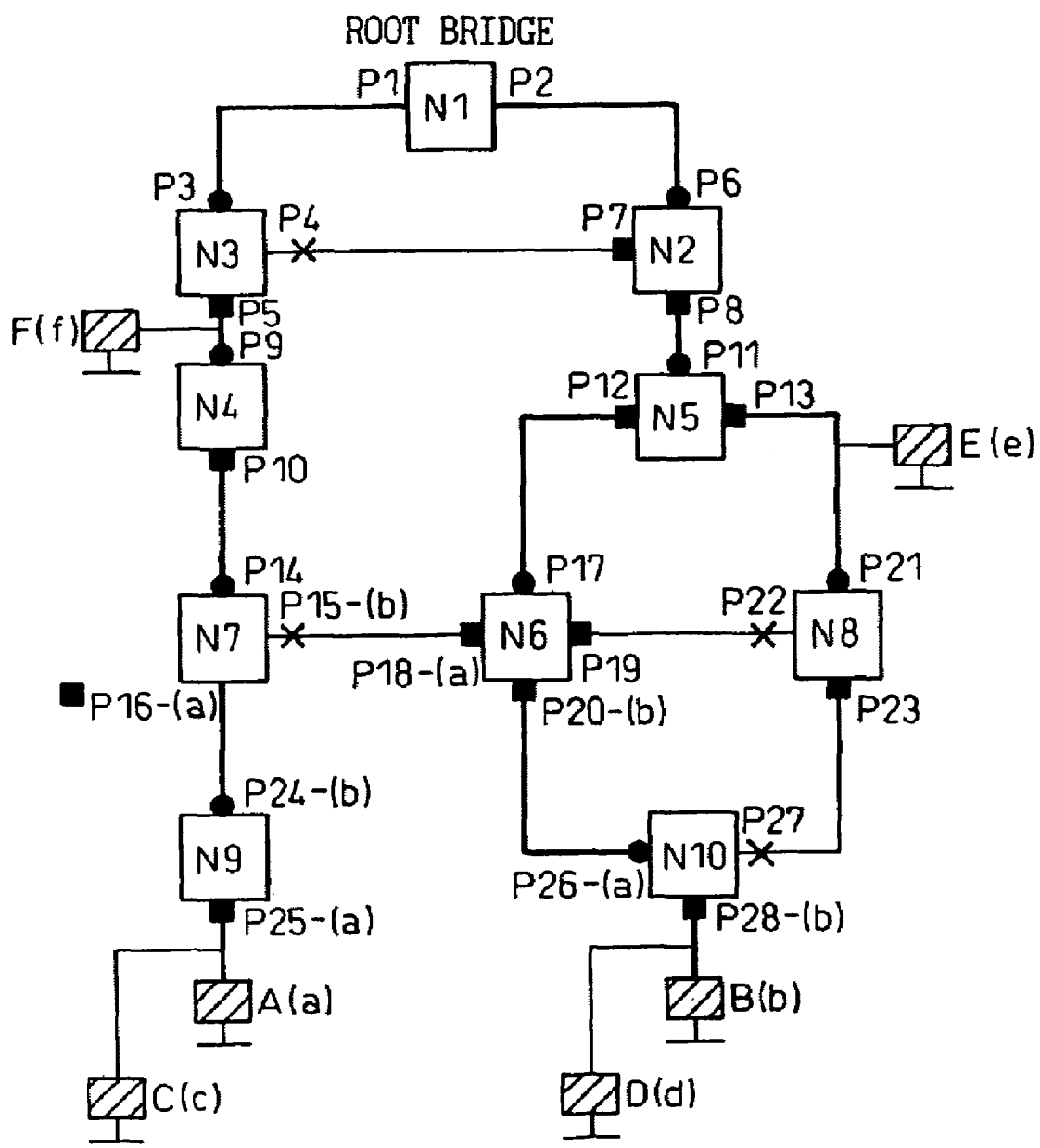
FIG. 19 is a diagram for explaining the operation when terminals are added after the formation of the bypass route.

Finally, an explanation will be given of how frames can be transmitted using the bypass route while not losing the usual blocking function even when frame transmitting terminals C to F are added as shown in FIG. 19 after the bypass route has been constructed.

First, an explanation will be given for the case in which communication is performed between the terminal A and the terminal D. When the terminal D transmits a frame X1 addressed to the terminal A, the frame X1 is transferred via the bypass route from the port P18 on the bridge N6 to the port P15 on the bridge N7 since, at the bridge N6, the address a is already learned on its port P18. In this case, the frame X1 is received on the port P15 which is a blocking port, but according to the process of FIG. 13, as the destination address a is already normally learned on the port P16 (step 1502), and the bypass route has been used for communication between the terminal A and the terminal B (step 1504), the frame X1 is transferred to the port P16 (step 1506) for transmission.

After the frame X1 has been transferred, when the terminal A transmits a frame X2 addressed to the terminal D, the frame X2 is transferred via the bypass route from the bridge N7 to the bridge N6 in accordance with the steps 1200, 1202, 1204, 1208, and E in FIGS. 10 and 11, because the address d has been temporarily learned on the port P15 during the transfer of the frame X1, and because the terminal A has transmitted a frame via the bypass route from the port P15.

Next, an explanation will be given for the case in which the terminal A transmits a frame X3 before the terminal D transmits the frame X1. As the address d of the terminal D is not learned on any bridge/port, the frame is transferred by passing through the root bridge. That is, the usual blocking function is working. At the bridge N6, the frame X3 with source address a and destination address d is received on the port P17, and the received frame is transferred to the ports P20 and P19 in accordance with the steps 1200, 1202, 1204, 1206, and D in FIGS. 10 and 11. At this time, the frame is not transferred to the port P18 to be relearned. The bridge N10 can thus receive the frame X3 which is then delivered to the terminal D. Here, at the bridge N6, as the address a is relearned on the port P17, the address a learned on the port P18 is unlearned. As a result, the bypass route from the bridge N6 to the bridge N7 is lost.

When the terminal D, after receiving the frame X3, transmits a frame X4 addressed to the terminal A, the frame X4 received by the bridge N6 is sent out from its port P17, toward the root bridge, because the address a learned on the port P18 was unlearned as described above. Thereafter, the communication between the terminal A and the terminal D is performed via the root bridge, that is, the bypass route is deleted during the communication from the terminal A to the terminal D, but the bypass route is constructed once again in accordance with the same procedures as performed during the communication between the terminal A and the terminal B as previously described.

Next, an explanation will be given for the case in which communication is performed between the terminal C and the terminal B. When the terminal C transmits a frame Y1 addressed to the terminal B, the frame Y1 is transferred via the bypass route between the bridge N7 and the bridge N6 because, at the bridge N7, the address b is normally learned on the port P15 (the learning state has already been switched from the temporary learning to the normal learning state during the communication between the terminals A and B). After the frame Y1 has been transferred, when the terminal B transmits a frame Y2 addressed to the terminal C, the frame Y2 is transferred via the bypass route between the bridge N7 and the bridge N6 in accordance with the contents of the learning done during the transfer of the frame Y1.

Next, an explanation will be given for the case in which the terminal B transmits a frame Y3 before the terminal C transmits the frame Y1. At the bridge N6, as the address c is not learned on its port P18, the frame Y3 sent out from the terminal B toward the terminal C is broadcast to the ports P17, P18, and P19 but, at the bridge N7, as the address c is not learned, temporary learning is not done on the port P15, nor is the frame Y1 transferred; as a result, the frame Y3 is transferred via the root bridge. That is, the usual blocking function is working. At the bridge N7, the frame Y3 with source address b and destination address c is received on the port P14, and the received frame is transferred to the port P16 in accordance with the steps 1200, 1202, 1204, 1206, and D in FIGS. 10 and 11.

In this case, at the bridge N7, as the address b is relearned on the port P14, the address b learned on the blocking port P15 is unlearned. As a result, the bypass route is lost, just as in the case of the transfer of the frame X3 from the terminal A to the terminal D, but the bypass route is constructed once again in accordance with the previously described procedures.

Next, an explanation will be given for the case in which communication is performed between the terminal C and the terminal D. In this case, there is a bypass route between the bridge N6 and the bridge N7, which was constructed during the communication between the terminal A and the terminal B, but the addresses c and d of the terminals C and D are not learned on either bridge; therefore, after performing communication via the root bridge in accordance with the same procedures as performed during the communication between the terminal A and the terminal B as previously described, communication is performed using the bypass route between the bridge N6 and the bridge N7 with a frame transfer from the terminal C as a trigger.

As is apparent from the above description, when performing communication between terminals connected at a level lower than the bypass route as seen from the root bridge, the communication can be performed without affecting the usual blocking function.

Next, an explanation will be given for the case where communication is performed between the terminal A and the terminal E which is closer to the root bridge than the bypass route is. When a frame Z1 addressed to the terminal A is sent out from the terminal E (when the learning of the address a on the bridges N1 to N5 has already vanished due to the expiration of the aging timer), as the bridge N5 does not have any information concerning the address a, the frame Z1 is broadcast, resulting in the formation of two paths, one from the bridge N5 to the bridge N9 passing through the root bridge N1, and the other passing through the bypass route from N6 to N7. Accordingly, at the bridges N6 and N7 between which the bypass route is constructed, provisions are made so that when a frame with address a or b for which the route has been switched from the root port to the designated port (or the blocking port) is received on the root port, the frame is not transferred on that switched route, as shown in the steps 1200, 1202, 1204, 1206, and C in FIGS. 10 and 11. This can be accomplished by holding the thus switched address in the state shown in the "switched port" entry in Table 8 or 9. As a result, the frame transfer via the bypass route is blocked, the terminal A does not receive the frame Z1 from both paths, and communication via the root port can thus be achieved. That is, the usual blocking function is working. In this case, a bypass route will eventually be formed between the bridge N2 and the bridge N3.

When the terminal A transmits a frame Z2 addressed to the terminal E after the frame Z1 has been transferred as described above, the bypass route formed between the bridge N2 and the bridge N3 is used for transferring the frame Z2. If the frame Z1 has not been transferred yet and, therefore, the address e has not been learned yet, the address e is yet not learned on the bridge N7; therefore, the frame Z2 is not transferred via the bypass route, but is broadcast and transferred via the root bridge in accordance with the usual bridge operation. That is, the usual blocking function is working. In this case also, a bypass route will eventually be formed between the bridge N2 and the bridge N3.

Communication between the terminal F and the terminal B is performed in a manner similar to the communication between the terminal A and the terminal E; that is, after performing communication via the root bridge, communication is performed using the bypass route formed between the bridge N2 and the bridge N3.

As is apparent from the above description, when performing communication between a terminal at a level higher than the bypass route and a terminal at a lower level as seen from the root bridge, the communication can be performed without affecting the usual blocking function.

In this way, even when another terminal transmits a frame after the bypass route has been constructed, the frame can be transferred using the bypass route, without affecting the usual blocking function.

As described above, according to the present invention, when data is received on a blocking port, the source address of the data is temporarily learned, and when transferring data after the temporary learning is done, the learning state is switched from temporary learning to normal learning, thus making it possible to form a bypass route based on the address learning. Further, by also transferring data to a designated port based on the STP port state identification during usual data transfer, a bypass route can be formed without using any special message. As this does not affect the address learning, a network can be constructed by mixing existing nodes therein.

The invention claimed is:

1. A spanning tree bypassing method comprising the steps of: (a) in a first node, sending a first frame, whose destination address is a first address and whose source address is a second address, out on a designated port as well as on a root port when the first frame is received, provided that learning is done on the root port so as to send any frame destined for the first address out on the root port; and (b) in a second node having received the first frame on a blocking port, sending a second frame, whose destination address is the second address, out on the blocking port when the second frame is received,
   (i) performing temporary learning so as to send any frame destined for the second address out on the blocking port, when the first frame is received on the blocking port; and
   (ii) sending the second frame, whose destination address is the second address, out on the blocking port by switching the temporary learning to normal learning when the second frame is received.

2. A method according to claim 1, wherein, in the substep (b) (i), the temporary learning is performed on the condition that learning is already done as to on which port a frame destined for the first address is to be sent out.

3. A method according to claim 1, wherein, in the step (a), the first frame is sent out on all designated ports.

4. A spanning tree bypassing apparatus comprising: means for sending a first frame, whose destination address is a first address, out on a designated port as well as on a root port when the first frame is received, provided that learning is done on the root port so as to send any frame destined for the first address out on the root port; and means for sending a second frame, whose destination address is a second address, out on a blocking port when the second frame is received after a third frame whose source address is the second address was received on the blocking port,
   wherein the blocking port send out means includes:
   means for performing temporary learning so as to send any frame destined for the second address out on the blocking port, when the third frame is received on the blocking port; and
   means for sending the second frame, whose destination address is the second address, out on the blocking port by switching the temporary learning to normal learning when the second frame is received.

5. An apparatus according to claim 4, wherein the temporary learning means performs the temporary learning on the condition that learning is already done as to on which port a frame destined for a destination address of the second frame is to be sent out.

6. An apparatus according to claim 4, wherein the designated-port send-out means sends the first frame out on all designated ports.

* * * * *